US012010637B2

(12) United States Patent
Nagarajan et al.

(10) Patent No.: US 12,010,637 B2
(45) Date of Patent: Jun. 11, 2024

(54) INDICATION METHODS FOR SYNCHRONIZATION SIGNAL BLOCK CONFIGURATION CHANGES

(71) Applicant: QUALCOMM Incorporated, San Diego, CA (US)

(72) Inventors: Anantha Krishna Karthik Nagarajan, San Diego, CA (US); Jun Ma, San Diego, CA (US); Tao Luo, San Diego, CA (US); Peter Gaal, San Diego, CA (US); Qiang Wu, San Diego, CA (US); Xiaoxia Zhang, San Diego, CA (US); Jing Sun, San Diego, CA (US); Mehmet Izzet Gurelli, San Diego, CA (US); Iyab Issam Sakhnini, San Diego, CA (US); Ahmed Abdelaziz Ibrahim Abdelaziz Zewail, San Diego, CA (US); Juan Montojo, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/347,259

(22) Filed: Jun. 14, 2021

(65) Prior Publication Data

US 2021/0392593 A1   Dec. 16, 2021

Related U.S. Application Data

(60) Provisional application No. 63/039,884, filed on Jun. 16, 2020, provisional application No. 63/038,255, filed on Jun. 12, 2020.

(51) Int. Cl.
*H04J 3/06* (2006.01)
*H04W 24/10* (2009.01)
(Continued)

(52) U.S. Cl.
CPC ......... *H04W 56/001* (2013.01); *H04W 24/10* (2013.01); *H04W 72/0446* (2013.01); *H04W 72/23* (2023.01); *H04W 76/11* (2018.02)

(58) Field of Classification Search
CPC ... H04W 56/001; H04W 76/11; H04W 24/10; H04W 72/042; H04W 72/0446; H04W 72/23
See application file for complete search history.

(56) References Cited

U.S. PATENT DOCUMENTS 10,172,122 B1 *   1/2019   Sung ................. H04L 5/0044
2019/0141693 A1 *  5/2019   Guo .................. H04W 16/14
(Continued)

*Primary Examiner* — Siren Wei
(74) *Attorney, Agent, or Firm* — Holland & Hart LLP

(57) ABSTRACT

Methods, systems, and devices for wireless communications are described. A user equipment (UE) may identify a configuration of a set of synchronization signal blocks (SSBs) to be transmitted by a first base station or a second base station. In some cases, the UE may be served by the first base station and the UE may receive, from the first base station or the second base station, a message indicating that a transmission of at least one SSB of the set of SSBs is canceled and indicating resources for a signal (e.g., a reference signal, alternative SSB transmission) to be transmitted by the first base station or the second base station as an alternative to the canceled at least one SSB. The UE may receive, based on the received message from the first base station or the second base station, the signal using the indicated resources.

28 Claims, 18 Drawing Sheets

(51) Int. Cl.
  *H04W 56/00*  (2009.01)
  *H04W 72/0446* (2023.01)
  *H04W 72/23*  (2023.01)
  *H04W 76/11*  (2018.01)

(56) References Cited

U.S. PATENT DOCUMENTS

| | | | |
|---|---|---|---|
| 2019/0261347 A1* | 8/2019 | Harada | H04W 72/21 |
| 2019/0281622 A1* | 9/2019 | Hwang | H04W 72/121 |
| 2020/0036482 A1* | 1/2020 | Park | H04L 1/1812 |
| 2020/0313779 A1* | 10/2020 | Kim | H04B 17/24 |
| 2020/0374725 A1* | 11/2020 | Chen | H04L 5/0053 |
| 2021/0044471 A1* | 2/2021 | Zhou | H04J 11/0086 |
| 2021/0235513 A1* | 7/2021 | Kim | H04W 74/0816 |

* cited by examiner

INDICATION METHODS FOR SYNCHRONIZATION SIGNAL BLOCK CONFIGURATION CHANGES

CROSS REFERENCE

The present application for patent claims the benefit of U.S. Provisional Patent Application No. 63/038,255 by JUN M A et al., entitled "MODIFYING SYNCHRONIZATION SIGNAL BLOCK (SSB) TRANSMISSION," filed Jun. 12, 2020, and to U.S. Provisional Patent Application No. 63/039,884 by Anantha Krishna Karthik Nagarajan et al., entitled "INDICATION METHODS FOR SYNCHRONIZATION SIGNAL BLOCK CONFIGURATION CHANGES" filed Jun. 16, 2020, each of which are assigned to the assignee hereof, and expressly incorporated by reference herein.

FIELD OF TECHNOLOGY

The following relates to wireless communications, including indication methods for synchronization signal block (SSB) configuration changes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may transmit synchronization signal blocks (SSB) on one or more downlink beams to one or more UEs in part to transmit system information to the UEs, or for the UEs to perform downlink channel measurements, or both. In some cases, downlink traffic may be transmitted in place of an SSB transmissions and the SSB transmission may be canceled. Conventional techniques for continuing downlink channel measurements may be improved.

SUMMARY

The described techniques relate to improved methods, systems, devices, and apparatuses that support indication methods for synchronization signal block (SSB) configuration changes. Generally, the described techniques provide for methods by which a base station may inform a user equipment (UE) of one or more canceled SSB transmissions and one or more reference signals that may be transmitted in place of the one or more canceled SSB transmissions. A UE may identify a configuration of a set of SSBs to be transmitted by a first base station of a second base station. In some cases, the UE may be served by the first base station and identify a configuration to receive a set of SSBs from the first base station. The UE may receive, from the first base station, a message indicating that a transmission of at least one SSB of the set of SSBs is canceled and indicating resources for a signal (e.g., a reference signal, alternative SSB transmission) to be transmitted by the first base station as an alternative to the canceled at least one SSB. In some cases, the UE may be served by the first base station and identify a configuration to receive a set of SSBs from a second base station. The second base station may transmit, to the first base station, a message indicating that at least one SSB is canceled and indicating resources for a signal (e.g., a reference signal, alternative SSB transmission) to be transmitted by the second base station. The first base station may relay the message to the UE. The UE may receive, based on the received message from the first base station, the signal from the first base station or the second base station using the indicated resources.

A method for wireless communications at a user equipment (UE) is described. The method may include identifying a configuration of a set of multiple SSBs to be transmitted by a first base station, receiving, from the first base station or a second base station, a message indicating that a transmission of at least one SSB of the set of multiple SSBs is canceled and indicating resources for a signal to be transmitted by the first base station as an alternative to the canceled at least one SSB, and receiving, based on the received message, the signal using the indicated resources.

An apparatus for wireless communications at a UE is described. The apparatus may include a processor, memory coupled with the processor, and instructions stored in the memory. The instructions may be executable by the processor to cause the apparatus to identify a configuration of a set of multiple SSBs to be transmitted by a first base station, receive, from the first base station or a second base station, a message indicating that a transmission of at least one SSB of the set of multiple SSBs is canceled and indicating resources for a signal to be transmitted by the first base station as an alternative to the canceled at least one SSB, and receive, based on the received message, the signal using the indicated resources.

Another apparatus for wireless communications at a UE is described. The apparatus may include means for identifying a configuration of a set of multiple SSBs to be transmitted by a first base station, means for receiving, from the first base station or a second base station, a message indicating that a transmission of at least one SSB of the set of multiple SSBs is canceled and indicating resources for a signal to be transmitted by the first base station as an alternative to the canceled at least one SSB, and means for receiving, based on the received message, the signal using the indicated resources.

A non-transitory computer-readable medium storing code for wireless communications at a UE is described. The code may include instructions executable by a processor to identify a configuration of a set of multiple SSBs to be transmitted by a first base station, receive, from the first base station or a second base station, a message indicating that a transmission of at least one SSB of the set of multiple SSBs is canceled and indicating resources for a signal to be transmitted by the first base station as an alternative to the canceled at least one SSB, and receive, based on the received message, the signal using the indicated resources.

In some examples of the method, apparatuses, and non-transitory computer-readable medium described herein, receiving the message indicating that the transmission of the at least one SSB may be canceled may include operations, features, means, or instructions for receiving, in the message and for each SSB of the canceled at least one SSB, an index or a resource location associated with the canceled at least one SSB.

Some examples of the method, apparatuses, and non-transitory computer-readable medium described herein may further include operations, features, means, or instructions for receiving, in the message, an indication of a duration for which the at least one SSB may be canceled.

In some examples of the method, apparatuses, and non-transitory computer-readable medium described herein, the signal may be a channel state information (CSI) reference signal (CSI-RS).

In some examples of the method, apparatuses, and non-transitory computer-readable medium described herein, the resources for the CSI-RS may be periodically or aperiodically configured.

In some examples of the method, apparatuses, and non-transitory computer-readable medium described herein, the signal may be an alternative SSB.

In some examples of the method, apparatuses, and non-transitory computer-readable medium described herein, the at least one SSB may be canceled based on ultra-reliable low latency communication traffic being scheduled on resources for the at least one SSB.

In some examples of the method, apparatuses, and non-transitory computer-readable medium described herein, the alternative SSB may be quasi co-located with the ultra-reliable low latency communication traffic.

In some examples of the method, apparatuses, and non-transitory computer-readable medium described herein, the message may be received from the first base station and the first base station may be a serving base station of the UE and the method, apparatuses, and non-transitory computer-readable medium may include further operations, features, means, or instructions for receiving, from the first base station, the signal using the indicated resources, performing a measurement procedure of the received signal and the one or more SSBs of the set of multiple SSBs, the measurement procedure including one or more of a layer one measurement procedure or a layer three mobility measurement procedure, and transmitting, to the first base station, a measurement report indicating a result of the performed measurement procedure.

In some examples of the method, apparatuses, and non-transitory computer-readable medium described herein, the message may be received from the second base station and the second base station may be a serving base station of one or more neighbor UEs and the method, apparatuses, and non-transitory computer-readable medium may include further operations, features, means, or instructions for receiving, from the first base station, the signal using the indicated resources, performing a measurement procedure of the received signal and one or more SSBs of the set of multiple SSBs, the measurement procedure including a layer three mobility measurement procedure, and transmitting, to the second base station, a measurement report indicating a result of the performed measurement procedure.

In some examples of the method, apparatuses, and non-transitory computer-readable medium described herein, receiving the message may include operations, features, means, or instructions for receiving, from the first base station, group-based downlink control information that includes the message indicating that the transmission of at least one SSB may be canceled and indicating the resources for the signal to be transmitted.

In some examples of the method, apparatuses, and non-transitory computer-readable medium described herein, the group-based downlink control information includes a cell identification (ID) of the first base station.

In some examples of the method, apparatuses, and non-transitory computer-readable medium described herein, receiving the message may include operations, features, means, or instructions for receiving, from the second base station, a radio resource control (RRC) transmission that includes the message indicating that the transmission of at least one SSB may be canceled and indicating the resources for the signal to be transmitted.

In some examples of the method, apparatuses, and non-transitory computer-readable medium described herein, the indicated resources for the signal may be different from resources indicated by the configuration for the canceled at least one SSB indicated by the configuration of the set of multiple SSBs.

In some examples of the method, apparatuses, and non-transitory computer-readable medium described herein, the at least one SSB may be canceled based on ultra-reliable low latency communication traffic being scheduled on resources indicated by the configuration for the at least one SSB and the method, apparatuses, and non-transitory computer-readable medium may include further operations, features, means, or instructions for receiving the ultra-reliable low latency communication traffic on the resources.

In some examples of the method, apparatuses, and non-transitory computer-readable medium described herein, rate matching the ultra-reliable low latency communication traffic around the signal and receiving the ultra-reliable low latency communication traffic and the signal via frequency division multiplexing.

A method for wireless communications at a first base station is described. The method may include identifying a configuration of a set of multiple SSBs to be transmitted by the first base station, identifying that downlink traffic is to be transmitted on resources indicated by the identified configuration for at least one SSB of the set of multiple SSBs, transmitting a message indicating that a transmission of the at least one SSB of the set of multiple SSBs is canceled and indicating resources for a signal to be transmitted by the first base station as an alternative to the canceled at least one SSB, and transmitting, based on the received message, the signal using the indicated resources.

An apparatus for wireless communications at a first base station is described. The apparatus may include a processor, memory coupled with the processor, and instructions stored in the memory. The instructions may be executable by the processor to cause the apparatus to identify a configuration of a set of multiple SSBs to be transmitted by the first base station, identify that downlink traffic is to be transmitted on resources indicated by the identified configuration for at least one SSB of the set of multiple SSBs, transmit a message indicating that a transmission of the at least one SSB of the set of multiple SSBs is canceled and indicating resources for a signal to be transmitted by the first base station as an alternative to the canceled at least one SSB, and transmit, based on the received message, the signal using the indicated resources.

Another apparatus for wireless communications at a first base station is described. The apparatus may include means for identifying a configuration of a set of multiple SSBs to be transmitted by the first base station, means for identifying that downlink traffic is to be transmitted on resources indicated by the identified configuration for at least one SSB of the set of multiple SSBs, means for transmitting a message indicating that a transmission of the at least one SSB of the set of multiple SSBs is canceled and indicating resources for a signal to be transmitted by the first base station as an alternative to the canceled at least one SSB, and means for transmitting, based on the received message, the signal using the indicated resources.

A non-transitory computer-readable medium storing code for wireless communications at a first base station is described. The code may include instructions executable by a processor to identify a configuration of a set of multiple SSBs to be transmitted by the first base station, identify that downlink traffic is to be transmitted on resources indicated by the identified configuration for at least one SSB of the set of multiple SSBs, transmit a message indicating that a transmission of the at least one SSB of the set of multiple SSBs is canceled and indicating resources for a signal to be transmitted by the first base station as an alternative to the canceled at least one SSB, and transmit, based on the received message, the signal using the indicated resources.

In some examples of the method, apparatuses, and non-transitory computer-readable medium described herein, transmitting the message indicating that the transmission of the at least one SSB may be canceled may include operations, features, means, or instructions for transmitting, in the message and for each SSB of the canceled at least one SSB, an index or a resource location associated with the canceled at least one SSB.

Some examples of the method, apparatuses, and non-transitory computer-readable medium described herein may further include operations, features, means, or instructions for transmitting, in the message, an indication of a duration for which the at least one SSB may be canceled.

In some examples of the method, apparatuses, and non-transitory computer-readable medium described herein, the signal may be a CSI-RS.

In some examples of the method, apparatuses, and non-transitory computer-readable medium described herein, the resources for the CSI-RS may be periodically or aperiodically configured.

In some examples of the method, apparatuses, and non-transitory computer-readable medium described herein, the signal may be an alternative SSB.

In some examples of the method, apparatuses, and non-transitory computer-readable medium described herein, the at least one SSB may be canceled based on ultra-reliable low latency communication traffic being scheduled on resources for the at least one SSB.

In some examples of the method, apparatuses, and non-transitory computer-readable medium described herein, the alternative SSB may be quasi co-located with the ultra-reliable low latency communication traffic.

In some examples of the method, apparatuses, and non-transitory computer-readable medium described herein, the message may be transmitted to a first UE served by the first base station via a wireless link and the method, apparatuses, and non-transitory computer-readable medium may include further operations, features, means, or instructions for transmitting, to the first UE, the signal using the indicated resources and receiving, from the first UE, a measurement report indicating a result of the first UE performing a measurement procedure on the signal, the measurement report including one or more of a layer one measurement report or a layer three mobility measurement report.

In some examples of the method, apparatuses, and non-transitory computer-readable medium described herein, the message may be transmitted to a second base station via a backhaul link serving a second UE and the method, apparatuses, and non-transitory computer-readable medium may include further operations, features, means, or instructions for transmitting, to the second UE, the signal using the indicated resources.

In some examples of the method, apparatuses, and non-transitory computer-readable medium described herein, transmitting the message may include operations, features, means, or instructions for transmitting, to a first UE served by the first base station, group-based downlink control information that includes the message indicating that the transmission of the at least one SSB may be canceled and indicating the resources for the signal to be transmitted.

In some examples of the method, apparatuses, and non-transitory computer-readable medium described herein, the group-based downlink control information includes a cell identification (ID) of the first base station.

In some examples of the method, apparatuses, and non-transitory computer-readable medium described herein, the indicated resources for the signal may be different from resources indicated by the configuration for the canceled at least one SSB indicated by the configuration of the set of multiple SSBs.

In some examples of the method, apparatuses, and non-transitory computer-readable medium described herein, the at least one SSB may be canceled based on ultra-reliable low latency communication traffic being scheduled on resources indicated by the configuration for the at least one SSB and the method, apparatuses, and non-transitory computer-readable medium may include further operations, features, means, or instructions for transmitting the ultra-reliable low latency communication traffic on the resources.

In some examples of the method, apparatuses, and non-transitory computer-readable medium described herein, rate matching the ultra-reliable low latency communication traffic around the signal and transmitting the ultra-reliable low latency communication traffic and the signal via frequency division multiplexing.

A method for wireless communications at a first base station is described. The method may include identifying a configuration of a set of multiple SSBs to be transmitted by a second base station, receiving, from the second base station, an indication that downlink traffic is to be transmitted by the second base station on resources indicated by the identified configuration for at least one SSB of the set of multiple SSBs, and transmitting, to a UE served by the first base station, a message indicating that a transmission of the at least one SSB of the set of multiple SSBs by the second base station is canceled and indicating resources for a signal to be transmitted by the second base station as an alternative to the canceled at least one SSB.

An apparatus for wireless communications at a first base station is described. The apparatus may include a processor, memory coupled with the processor, and instructions stored in the memory. The instructions may be executable by the processor to cause the apparatus to identify a configuration of a set of multiple SSBs to be transmitted by a second base station, receive, from the second base station, an indication that downlink traffic is to be transmitted by the second base station on resources indicated by the identified configuration for at least one SSB of the set of multiple SSBs, and transmit, to a UE served by the first base station, a message indicating that a transmission of the at least one SSB of the set of multiple SSBs by the second base station is canceled and indicating resources for a signal to be transmitted by the second base station as an alternative to the canceled at least one SSB.

Another apparatus for wireless communications at a first base station is described. The apparatus may include means for identifying a configuration of a set of multiple SSBs to be transmitted by a second base station, means for receiving, from the second base station, an indication that downlink traffic is to be transmitted by the second base station on resources indicated by the identified configuration for at least one SSB of the set of multiple SSBs, and means for transmitting, to a UE served by the first base station, a message indicating that a transmission of the at least one SSB of the set of multiple SSBs by the second base station is canceled and indicating resources for a signal to be transmitted by the second base station as an alternative to the canceled at least one SSB.

A non-transitory computer-readable medium storing code for wireless communications at a first base station is described. The code may include instructions executable by a processor to identify a configuration of a set of multiple SSBs to be transmitted by a second base station, receive, from the second base station, an indication that downlink traffic is to be transmitted by the second base station on resources indicated by the identified configuration for at least one SSB of the set of multiple SSBs, and transmit, to a UE served by the first base station, a message indicating that a transmission of the at least one SSB of the set of multiple SSBs by the second base station is canceled and indicating resources for a signal to be transmitted by the second base station as an alternative to the canceled at least one SSB.

In some examples of the method, apparatuses, and non-transitory computer-readable medium described herein, receiving the indication that downlink traffic may be to be transmitted by the second base station may include operations, features, means, or instructions for receiving, from the second base station, a message indicating that the transmission of the at least one SSB of the set of multiple SSBs by the second base station may be canceled and indicating resources for the signal to be transmitted by the second base station as an alternative to the canceled at least one SSB.

In some examples of the method, apparatuses, and non-transitory computer-readable medium described herein, transmitting the message indicating that the transmission of the at least one SSB may be canceled may include operations, features, means, or instructions for transmitting, in the message and for each SSB of the canceled at least one SSB, an index or a resource location associated with the canceled at least one SSB.

Some examples of the method, apparatuses, and non-transitory computer-readable medium described herein may further include operations, features, means, or instructions for identifying, based on identified downlink traffic, a duration for which the at least one SSB may be canceled.

In some examples of the method, apparatuses, and non-transitory computer-readable medium described herein, the signal may be a CSI-RS.

In some examples of the method, apparatuses, and non-transitory computer-readable medium described herein, the resources for the CSI-RS may be periodically or aperiodically configured.

In some examples of the method, apparatuses, and non-transitory computer-readable medium described herein, the signal may be an alternative SSB.

Some examples of the method, apparatuses, and non-transitory computer-readable medium described herein may further include operations, features, means, or instructions for receiving, from the UE, a measurement report indicating a result of the signal transmitted by the second base station, the measurement report including a layer three mobility measurement report.

In some examples of the method, apparatuses, and non-transitory computer-readable medium described herein, the indicated resources for the signal may be different from resources indicated by the configuration for the canceled at least one SSB indicated by the configuration of the set of multiple SSBs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
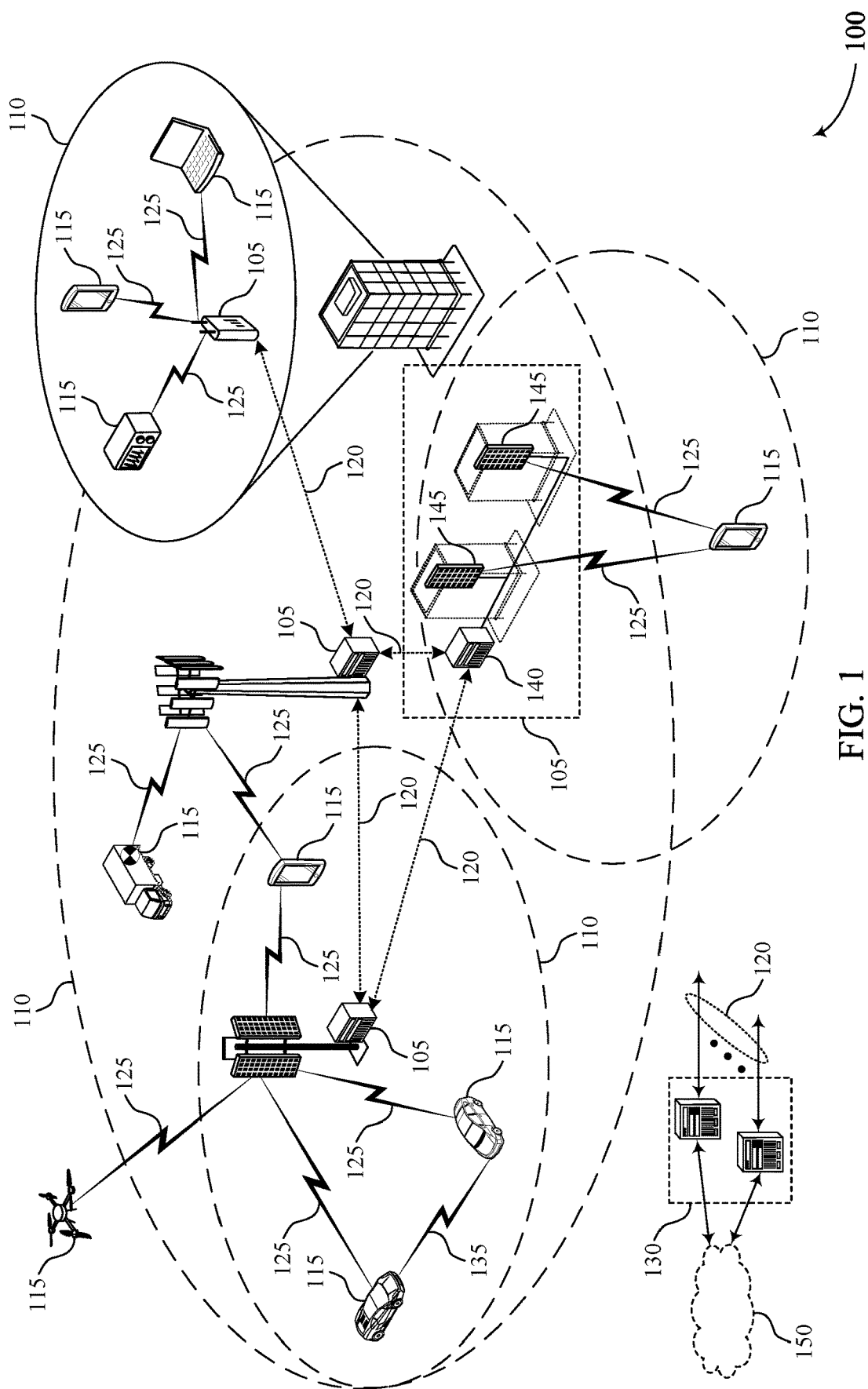
FIG. 1 illustrates an example of a wireless communications system that supports indication methods for synchronization signal block (SSB) configuration changes in accordance with aspects of the present disclosure.

In some wireless communications systems, a base station may transmit synchronization signal blocks (SSB) on one or more downlink beams to one or more user equipment's (UEs) in part to transmit system information to the UEs, or for the UEs to perform downlink channel measurements, or both. In some cases, a UE may be scheduled to receive a set of SSBs from one or more base stations, such as a first base station and a second base station, where the first base station may be the serving base station of the UE. In some cases, the first or the second base station may identify that downlink traffic (e.g., latency-sensitive traffic, such as aperiodic or periodic ultra-reliable low latency (URLLC) traffic) is to be transmitted in place of one or more of the SSB transmissions and the SSB transmission may be canceled.

In conventional communications systems, the UE may not be informed of the one or more canceled SSBs. As such, if the UE does not receive the one or more SSBs, the UE may determine that the UE did not receive the one or more SSBs due to poor downlink channel quality when, instead, the SSBs were canceled and not transmitted by the base station. Further, due to the SSB cancellation, the UE may lose a downlink channel measurement opportunity. In some cases (e.g., high subcarrier spacing, such as 120 kHz, 240 kHz, or higher subcarrier spacings), the next scheduled SSB measurement opportunity may not occur for a large number of slots. As such, decreased reliability and network performance may result.

To improve network reliability and performance, a UE may be configured to receive an indication (e.g., via a downlink control information (DCI) message, or radio resource control (RRC) message) that the one or more SSB transmissions are canceled and an indication that one or more signals (e.g., reference signals, such as channel state information (CSI) reference signals (CSI-RSs), or alternative SSB transmissions) may be transmitted as an alternative to the one or more canceled SSB transmissions. The indication may include an index and/or location of the canceled SSBs, a duration for which the SSBs may be impacted, or a location of the CSI-RSs being transmitted in place of the canceled SSBs, or a combination thereof.

In some implementations, the UE may be served by a first base station and identify a schedule to receive a set of SSBs from the first base station or a second base station (e.g., a neighboring base station, a non-serving base station). For example, the UE may identify a configuration of a set of SSBs to be transmitted by the first base station. The first base station may identify that downlink traffic is to be transmitted on resources indicated by the identified configuration for at least one SSB of the set of SSBs and transmit, to the UE, a message (e.g., a DCI message) indicating that a transmission of at least one SSB of the set of SSBs is canceled and indicating resources for a signal (e.g., a reference signal, such as a CSI-RS, or alternative SSB transmission) to be transmitted by the first base station as an alternative to the canceled at least one SSB. The UE may receive the signal (e.g., for measurement) based on the received message, the signal using the indicated resources.

Additionally or alternatively, the UE may identify a configuration of a set of SSBs to be transmitted by the second base station, the non-serving base station. The second base station may identify that downlink traffic is to be transmitted on resources indicated by the identified configuration for at least one SSB of the set of SSBs and transmit, to the first base station (e.g., via a backhaul communications link, such as an Xn link), an indication that downlink traffic is to be transmitted by the second base station on resources indicated by the identified configuration for at least one SSB of the plurality of SSBs. The first base station may transmit, to the UE served by the first base station (e.g., via an RRC message), a message indicating that a transmission of the at least one SSB of the set of SSBs by the second base station is canceled and indicating resources for a signal (e.g., a reference signal, such as a CSI-RS, or alternative SSB transmission) to be transmitted by the second base station as an alternative to the canceled at least one SSB. The UE may receive based on the received message, the signal from the second base station using the indicated resources.

Particular aspects of the subject matter described herein may be implemented to realize one or more advantages. The described techniques may support improvements in downlink channel measurement procedures by improving reliability and flexibility among other advantages. As such, supported techniques may include improved network operations and, in some examples, may promote network efficiencies, among other benefits.

Aspects of the disclosure are initially described in the context of wireless communications systems. Aspects are then described with respect to SSB schedules and process flows. Aspects of the disclosure are further illustrated by and described with reference to apparatus diagrams, system diagrams, and flowcharts that relate to indication methods for SSB configuration changes.

FIG. 1 illustrates an example of a wireless communications system 100 that supports indication methods for SSB configuration changes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, a base station 105 may transmit SSBs (SSB) on one or more downlink beams to one or more UEs 115 in part to transmit system information to the UEs 115, or for the UEs 115 to perform downlink channel measurements, or both. In some cases, a UE 115 may be scheduled to receive a set of SSBs from one or more base stations 105, such as a first base station 105 and a second base station 105, where the first base station 105 may be the serving base station 105 of the UE 115. In some cases, the first or the second base station 105 may identify that downlink traffic is to be transmitted in place of one or more of the SSB transmissions and the SSB transmission may be canceled. The techniques described herein may provide for methods by which the UE 115 may be informed of one or more canceled SSB transmissions and one or more signals (e.g., reference signals, SSB transmissions) that may be transmitted in place of the one or more canceled SSB transmissions.

For example, the UE 115 may identify a configuration of a set of SSBs to be transmitted by the first base station 105. The first base station 105 may identify that downlink traffic is to be transmitted on resources indicated by the identified configuration for at least one SSB of the set of SSBs and transmit, to the UE 115, a message indicating that a transmission of at least one SSB of the set of SSBs is canceled and indicating resources for a signal to be transmitted by the first base station 105 as an alternative to the canceled at least one SSB. The UE 115 may receive, from the first base station 105, based on the received message, the signal using the indicated resources.

In another example, the UE 115 may identify a configuration of a set of SSBs to be transmitted by the second base station 105, the non-serving base station 105. The second base station 105 may identify that downlink traffic is to be transmitted on resources indicated by the identified configuration for at least one SSB of the set of SSBs and transmit, to the first base station 105, an indication that downlink traffic is to be transmitted by the second base station 105 on resources indicated by the identified configuration for at least one SSB of the plurality of SSBs. The first base station 105 may transmit, to the UE 115, served by the first base station 105, a message indicating that a transmission of the at least one SSB of the set of SSBs by the second base station 105 is canceled and indicating resources for a signal to be transmitted by the second base station 105 as an alternative to the canceled at least one SSB. The UE 115 may receive based on the received message, the signal from the second base station 105 using the indicated resources.

Figure 2:
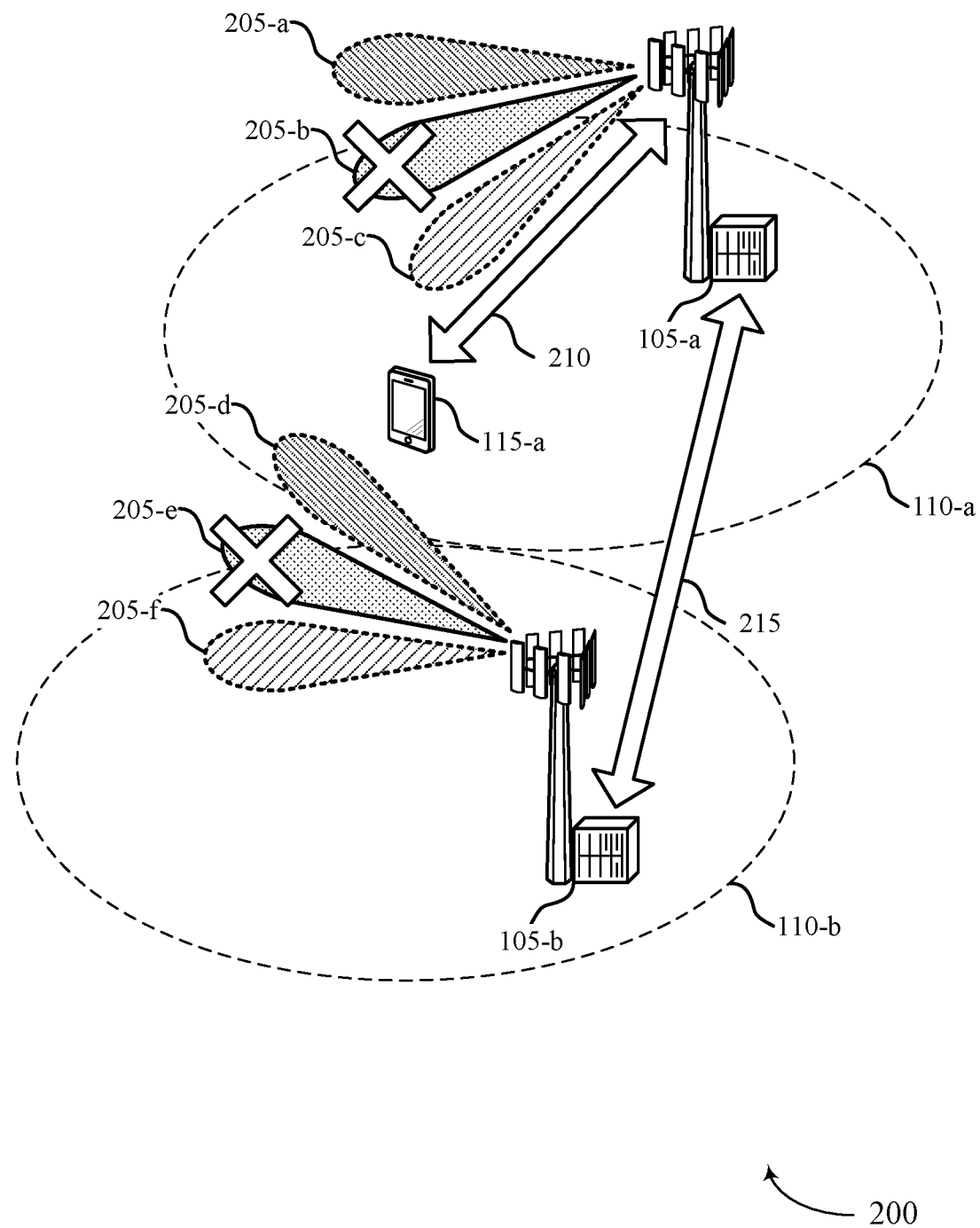
FIG. 2 illustrates an example of a system for wireless communications that supports indication methods for SSB configuration changes in accordance with aspects of the present disclosure.

FIG. 2 illustrates an example of a wireless communications system 200 that supports indication methods for SSB configuration changes in accordance with aspects of the present disclosure. The wireless communications system 200 may include base stations 105-a and 105-b and UE 115-a, which may be examples of base stations 105 and a UE 115 as described with reference to FIG. 1. Base station 105-a may serve a geographic coverage area 110-a and base station 105-b may serve geographic coverage area 110-b. In some cases, base station 105-a or base station 105-b may implement an SSB cancellation procedure. Additionally or alternatively, other wireless devices, such as UE 115-a may implement or participate in an SSB cancellation procedure.

In some cases, at a base station 105, a transmit processor may receive data from a data source and control information from a controller/processor. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) may be a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor may process (e.g., encode and symbol map) the data and control information to obtain data symbols and control symbols, respectively. The transmit processor may also generate reference symbols, such as for the primary synchronization signal (PSS), secondary synchronization signal (SSS), and CSI-RS. A transmit multiple-input multiple-output (MIMO) processor may perform spatial processing (e.g., precoding) on the data symbols, the control symbols, and/or the reference symbols, if applicable, and may provide output symbol streams to one or more modulators. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the one or more modulators may be transmitted via one or more antennas.

In some cases, at a UE 115, one or more antennas may receive the downlink signals from the base station 105 and may provide received signals to one or more demodulators in one or more transceivers. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector may obtain received symbols from all the demodulators, perform MIMO detection on the received symbols if applicable, and provide detected symbols. A receive processor may process (e.g., demodulate, deinterleave, and decode) the detected symbols, provide decoded data for the UE 115 to a data sink, and provide decoded control information to a controller/processor.

On the uplink, at a UE 115, a transmit processor may receive and process data (e.g., for the PUSCH) from a data source and control information (e.g., for the physical uplink control channel (PUCCH) from the controller/processor. The transmit processor may also generate reference symbols for a reference signal (e.g., for the sounding reference signal (SRS)). The symbols from the transmit processor may be precoded by a transmit MIMO processor, and if applicable, further processed by the modulators in the one or more transceivers (e.g., for SC-FDM, etc.), and transmitted to the base station 105. At the base station 105, the uplink signals from the UE 115 may be received by the one or more antennas, processed by the demodulators, detected by a MIMO detector, and if applicable, further processed by a receive processor to obtain decoded data and control information sent by the UE 115. The receive processor may provide the decoded data to a data sink and the decoded control information to the controller/processor. In some cases, a memory may store data and program codes for the base station 105 and a memory may store data and program codes for the UE 115. A scheduler may schedule UEs 115 for data transmission on the downlink and/or uplink.

In some wireless communications systems, such as NR, the wireless communications system may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into sub-bands. For example, a subband may cover multiple RBs. NR may support a base subcarrier spacing (SCS) of 15 kHz and other SCS may be defined with respect to the base SCS (e.g., 30 kHz, 60 kHz, 120 kHz, 240 kHz, etc.). The symbol and slot lengths scale with the subcarrier spacing. The CP length also depends on the subcarrier spacing.

A UE 115 (e.g., UE 115-a) may be served by a base station 105, such as base station 105-a. In some cases, UE 115-a (e.g., a connected UE 115) may identify a configuration to receive a set of SSBs from base station 105-a. UE 115-a may attempt to receive one or more of the SSBs 220 in the set of SSBs to estimate the downlink channel between UE 115-a and base station 105-a and to determine a preferred beam (e.g., a preferred downlink beam 205) for communicating with base station 105-a. For example, base station 105-a may transmit an SSB burst across a set of downlink beams (e.g., downlink beams 205-a, 205-b, and 205-c) in a beam sweeping procedure such that the beam direction for each SSB transmission 220 is different. As such, each SSB transmission 220 is associated with a different beam. For example, base station 105-a may transmit SSB 1 220-a using downlink beam 205-a, transmit SSB 2 220-b using downlink beam 205-b, and transmit SSB 3 220-c using downlink beams 205-c, where SSBs 220-a, 220-b, and 220-c.

UE 115-a may attempt to receive one or more of the SSBs 220 transmitted on downlink beams 205. For the SSBs 220 UE 115-a does receive, UE 115-a may measure the channel associated with the downlink beam 205 on which the SSB 220 was received. UE 115-a may perform channel measurements such as layer 1 (L1) measurements or layer 3 (L3) measurements of the downlink channel between the UE 115 and serving base station 105 (e.g., base station 105-a). The L1 measurements may include L1-reference signal received power (RSRP), L1-reference signal received quality (RSRQ), L1-signal to interference plus noise ratio (SINR), etc. The L3 measurements may be referred to as mobility measurements and may include L3-RSRP, L3-RSRQ, L3-SINR, etc.

In some cases, UE 115-a may identify an SSB index or identifier (e.g., a unique SSB identifier) that enables UE 115-a to determine which SSBs 220 UE 115-a received and which SSBs 220 are associated with the highest or preferred channel quality. By using the SSB identifier, UE 115-a may determine which SSB 220 is associated with which downlink beam 205. For example, UE 115-a may receive SSB 1 220-a, SSB 2 220-b, and SSB 3 220-c and perform one or more measurements on each of the received SSBs. UE 115-a may determine the SSB 220 associated with preferred channel parameters (e.g., quality, power), or rank the SSBs 220 based on the preferred channel parameters. UE 115-a may identify each received SSB 220 based on the SSB index or identifier, map the SSB 220 to the beam on which the SSB 220 was transmitted, and determine a preferred downlink beam 205 and/or rank the downlink beams 205 based on the SSB measurements. In cases where UE 115-a receives SSB 1 220-a, SSB 2 220-b, and SSB 3 220-c, UE 115-a may determine that SSB 1 220-a is associated with downlink beam 205-a, SSB 2 220-b is associated with downlink beam 205-b, SSB 3 220-c is associated with downlink beam 205-c.

In some cases, base station 105-a may determine to transmit traffic (e.g., a data transmission) that conflicts with one or more SSB positions (e.g., time and frequency positions). The traffic may be high priority traffic such as URLLC traffic (e.g., a URLLC PDSCH) or other latency sensitive or reliability sensitive traffic. In some cases, the data transmission may not be quasi co-located with the SSB in whose position the data transmission is being scheduled. Two antenna ports may be considered quasi co-located if the properties for one antenna port that a symbol is transmitted can be inferred form the channel for another antenna port that a channel is transmitted. Examples of the channel properties that may be used may include, but are not limited to, Doppler Shift, Doppler spread, average delay, delay spread, and the like. As such, the beam that the data transmission may be transmitted on is different than the beam the corresponding SSB will be transmitted on. To ensure that the high priority traffic is transmitted, base station 105-a may cancel the one or more conflicting SSBs 220. For example, base station 105-a may determine to transmit the data traffic in the same position as SSB 2 220-b and base station 105-a may determine to cancel SSB 2 220-b on downlink beam 205-b.

To maintain reliability in the network, base station 105-a may transmit an indication of the canceled one or more SSBs (e.g., SSB 2 220-a) to each impacted UE 115, such as UE 115-a. Additionally or alternatively, base station 105-a may configure one or more signals to be transmitted by base station 105-a as an alternative to the one or more canceled SSBs. For example, base station 105-a may configure one or more CSI-RSs to be transmitted as an alternative. The one or more CSI-RSs may be transmitted in different positions (e.g., time and/or frequency positions) than the one or more canceled SSBs 220 but transmitted on the same beam. In another example, base station 105-a may configure one or more alternative SSBs to be transmitted as an alternative. In some cases, base station 105-a may switch the conflicting SSB with a different, alternative SSB that is quasi co-located with the higher priority transmission.

Base station 105-a may transmit an indication of the one or more canceled SSBs and an indication of the one or more signals (e.g., reference signals, alternative SSBs) to each impacted UE 115, such as UE 115-a. For example, base station 105-a may transmit, to UE 115-a, via communication link 210, a message including at least one of an index of the canceled SSBs, a location of the SSBs 220 (e.g., time location, frequency location), a duration for which the one or more SSBs 220 may be canceled (e.g., any number of SSBs burst periods), and information related to the location of the one or more signals to be transmitted in place of the one or more canceled SSBs (e.g., an indication that the one or more signals are transmitted periodically or aperiodically, a time location of the one or more signals, a frequency location of the one or more signals). In some implementations, the message may be a DCI signal or may be included in a DCI signal. The DCI may be UE-specific or may be a group-specific DCI addressed and transmitted to a set of UEs 115 in group. In some cases, a DCI format may be configured to include such information described herein, such as an indication of canceled SSBs, an indication of signals to be transmitted as a replacement to the one or more canceled SSBs, etc. In some cases, the DCI may include a bitmap, where the bitmap may indicate a position of one or more canceled SSBs, and/or a position of one or more alternative signals. In some cases, the DCI may include a cell ID of a network entity, such as an ID associated with base station 105-a.

UE 115-a may receive the message (e.g., DCI signal) from base station 105-a via communication link 210 and identify the one or more SSBs that have been canceled based on the received message. For example, UE 115-a may identify that SSB 2 220-b has been canceled. In some cases, UE 115-a may not attempt to receive the one or more canceled SSBs. Additionally or alternatively, UE 115-a may identify one or more signals to be transmitted as an alternative to the one or more canceled SSBs and identify the schedule for receiving the one or more signals. UE 115-a may receive the one or more signals based on the identified schedule and perform one or more channel measurements (e.g., RSRP, RSRQ, SINR) or perform beam refinement based on the one or more received signals. In some cases, UE 115-a may receive the one or more signals on downlink beams 205 that are associated with the one or more canceled SSBs. For example, UE 115-a may receive one or more signals on downlink beam 205-b. As such, in combination with the one or more received SSBs (e.g., SSB 1 220-a and SSB 3 220-c), UE 115-a may use the channel measurements from the one or more signals received at least on downlink beam 205-b and the one or more SSBs received at least on downlink beams 205-a and 205-c to determine a preferred downlink beam 205 or to rank the downlink beams 205 based on the channel measurements. In some cases, UE 115-a may be configured to transmit a CSI measurement report to base station 105-a that implicitly or explicitly indicates the one or more L1 or L3 measurements performed by UE 115-a based on the one or more received signals (e.g., CSI-RSs), and/or an indication of one or more preferred downlink beams 205.

In some implementations, in addition or as an alternative to identifying a configuration to receive a set of SSBs from base station 105-a, UE 115-a may identify a configuration to receive a set of SSBs from base station 105-b (e.g., a non-serving or neighboring base station). For example, UE 115-a may identify a configuration to receive SSB 1 220-a, SSB 2 220-b, and SSB 3 220-c from base station 105-b. UE 115-a may attempt to receive one or more of the SSBs 220 in the set of SSBs to estimate the downlink channel between UE 115-a and base station 105-b and to determine a preferred beam (e.g., downlink beam 205) for communicating with base station 105-b. For example, base station 105-b may transmit an SSB burst across a set of downlink beams (e.g., downlink beams 205-d, 205-e, and 205-f) in a beam sweeping procedure such that the beam direction for each SSB transmission 220 is different. For example, base station 105-b may transmit SSB 1 220-a using downlink beam 205-f, transmit SSB 2 220-b using downlink beam 205-e, and transmit SSB 3 220-c using downlink beams 205-d.

UE 115-a may attempt to receive one or more of the SSBs 220 transmitted on downlink beams 205 from base station 105-b. For the SSBs 220 UE 115-a does receive, UE 115-a may measure the channel associated with the downlink beam 205 on which the SSB 220 was received. UE 115-a may perform channel measurements such as L3 measurements (e.g., mobility measurement such as L3-RSRP, L3-RSRQ, L3-SINR) on the downlink channel from a non-serving base station 105 of UE 115-a (e.g., base station 105-b). Similarly to the measurements performed on the downlink channels between UE 115-a and base station 105-a, UE 115-a may perform channel measurements of the channel between UE 115-a and base station 105-b to determine one or more preferred downlink beams 205 from base station 105-b, for example, if UE 115-a performed a handover procedure to base station 105-b.

In some cases, base station 105-b may determine to transmit traffic (e.g., data transmission, high priority traffic, URLLC traffic, URLLC PDSCH) that conflicts with one or more SSB positions (e.g., time and frequency positions). In some cases, the data transmission may not be quasi co-located with the SSB that the data transmission is being scheduled in the position of. To ensure that the high priority traffic is transmitted, base station 105-b may cancel the one or more conflicting SSBs 220. For example, base station 105-b may determine to transmit the data traffic in the same position as SSB 2 220-b and base station 105-b may determine to cancel SSB 2 220-b on downlink beam 205-e.

To maintain reliability in the network, base station 105-b may transmit a message to the serving base station 105 of UE 115-a (e.g., base station 105-a), for example, over backhaul communication link 215, that includes an indication that downlink traffic is to be transmitted by base station 105-b on resources indicated by the identified configuration for at least one SSB 220. In some cases, the message may indicate the one or more resources and/or the one or more SSBs 220 that are impacted by the downlink traffic and are canceled and may indicate one or more signals (e.g., reference signals, such as CSI-RSs, or alternative SSB transmissions) to be transmitted as an alternative to the one or more canceled SSBs 220.

Based on receiving the message from base station 105-b, base station 105-a may relay the same message or a similar message to UE 115-a via communications link 210. For example, base station 105-a may transmit, to UE 115-a, a message including one or more of an index of the canceled SSBs, a location of the SSBs (e.g., time location, frequency location), a duration for which one or more SSBs may be canceled (e.g., any number of SSBs burst periods), and information related to the location of the one or more signals (e.g., CSI-RSs, alternative SSBs) to be transmitted in place of the one or more canceled SSBs (e.g., an indication that the one or more signals are transmitted periodically or aperiodically, a time location of the one or more signals, a frequency location of the one or more signals). In some implementations, the message may be an RRC message or may be included in an RRC message. In some cases, the RRC message may be configured to include an additional set of bits to indicate such information described herein, such as an indication of canceled SSBs by a non-serving base station 105, an indication of signals to be transmitted by the non-serving base station 105 as a replacement to the one or more canceled SSBs, etc.

UE 115-a may receive the message (e.g., RRC message) from base station 105-a via communication link 210 and identify the one or more SSBs from base station 105-b that have been canceled based on the received message. For example, UE 115-a may identify that SSB 2 220-b has been canceled. In some cases, UE 115-a may not attempt to receive the one or more canceled SSBs. UE 115-a may identify one or more signals to be transmitted as an alternative to the one or more canceled SSBs and identify the schedule for receiving the one or more signals. UE 115-a may receive the one or more signals from base station 105-b based on the identified schedule and perform one or more channel measurements (e.g., RSRP, RSRQ, SINR) or perform beam refinement based on the one or more received signals. In some cases, UE 115-a may receive the one or more signals on downlink beams 205 that are associated with the one or more canceled SSBs 220. For example, UE 115-a may receive one or more signals on downlink beam 205-e. As such, in combination with the one or more received SSBs (e.g., SSB 1 220-a and SSB 3 220-c), UE 115-a may use the channel measurements from the one or more signals received at least on downlink beam 205-e and the one or more SSBs received at least on downlink beams 205-d and 205-f to determine a preferred downlink beam 205 or to rank the downlink beams 205 based on the channel measurements. In some cases, UE 115-a may be configured to transmit a CSI measurement report to its serving base station 105 (e.g., base station 105-a) that implicitly or explicitly indicates the one or more L3 measurements performed by UE 115-a based on the one or more received signals (e.g., CSI-RSs), and/or an indication of one or more preferred downlink beams 205. In some cases, base station 105-a may relay the measurement report to base station 105-b via backhaul link 215.

Additionally or alternatively, when an SSB from a non-serving base station 105 is canceled, UE 115-a may not receive an indication of alternative signals and/or may not receive and perform L3 measurements on alternative signals. Rather, UE 115-a may receive, from base station 105-a, an indication that at least one SSB 220 from base station 105-b is canceled. UE 115-a may refrain from attempting to receive the canceled SSB 220 based on the indication and wait to receive the next schedule SSB 220 from base station 105-b.

Figure 3:
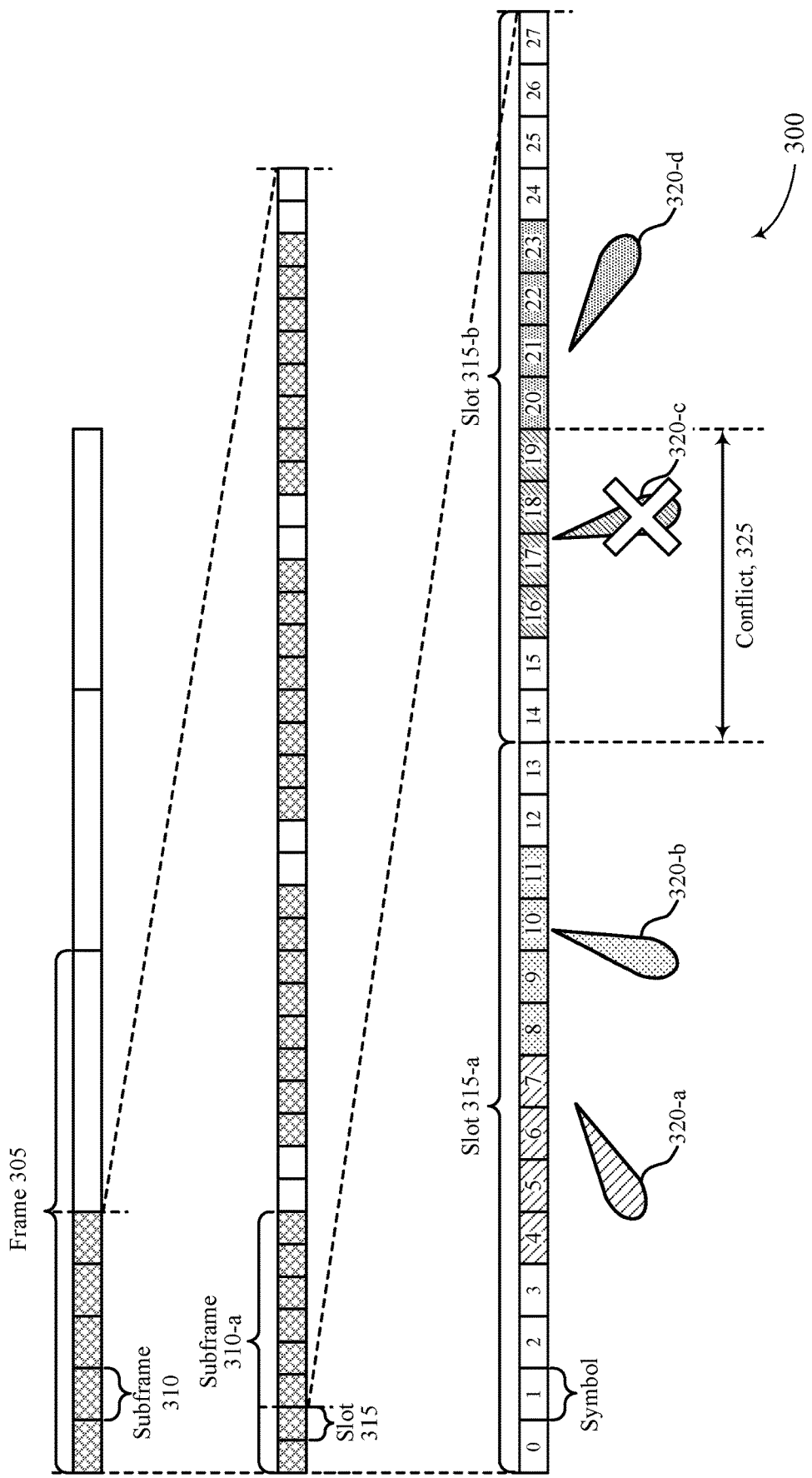
FIGS. 3 and 4 illustrate examples of SSB schedules that support indication methods for SSB configuration changes in accordance with aspects of the present disclosure.

FIG. 3 illustrates an example of an SSB schedule 300 that supports indication methods for SSB configuration changes in accordance with aspects of the present disclosure. The SSB schedule 300 may be configured by a base station and identified by a UE, which may be examples of a base station and a UE as described with reference to FIGS. 1 and 2. In some cases, a base station may implement an SSB cancellation procedure that impacts the SSB schedule 300. Additionally or alternatively, other wireless devices, such as UE 115 may implement or participate in an SSB cancellation procedure that impacts the SSB schedule 300.

As described with reference to FIG. 2, a UE may identify a configuration for receiving a set of SSBs from a base station. Certain locations (e.g., time locations) of a frame 305 may be allocated as potential SSB locations 330 where SSBs may be scheduled. In some cases, a set of subframes 310 of a frame 305 may be allocated for SSBs, where a frame 305 may include 10 subframes. For example, SSBs may be scheduled in the first five subframes 310 of a frame 305 in the example depicted in FIG. 3. In some cases, a set of slots 315 of a subframe 310 may be allocated for SSBs, where a subframe 310 may include 8 slots 315. Each symbol in a slot may indicate a link direction (e.g., downlink, uplink, or flexible) for data transmission and the link direction for each subframe may be dynamically switched. The link directions may be based on the slot format. Each slot may include downlink and/or uplink data as well as downlink and/or uplink control information.

For example, SSBs may be scheduled in the first eight slots 315 of the first subframe 310-a of a first frame 305. In some cases, a set of symbols of a slot 315 may be allocated for SSBs, where the number of symbols in a slot 315 may depend on subcarrier spacing. For example, in the case of 120 kHz subcarrier spacing, two frames 305 may be a duration of 10 ms, where one frame may be a duration of 5 ms. As such, a subframe 310 may be a duration of 1 ms.

Each subframe 310 may include 8 slots, where each slot may be a duration of 0.125 ms. At 120 kHz subcarrier spacing, 1 slot may include 14 symbols (e.g., OFDM symbols). As depicted in FIG. 3, slot 315-a includes symbols 0 through 13 (e.g., 14 slots), and slot 315-b includes symbols 14 through 27 (e.g., 14 slots). An SSB transmission may include a PSS, an SSS, and a two symbol PBCH. For example, an SSB transmission 335 may include four symbols, where 1-symbol may be for a PSS transmission, 1-symbol may be for an SSS transmission, and 2-symbols may be for a PBCH transmission. The SSB may be transmitted in a fixed slot location, such as the symbols 0-3. The PSS and SSS may be used by UEs for cell search and acquisition. The PSS may provide half-frame timing, and the synchronization signal may provide the CP length and frame timing. The PSS and SSS may provide the cell identity. The PBCH may carry basic system information, such as downlink system bandwidth, timing information within radio frame, synchronization signal burst set periodicity, system frame number, etc. In some cases, SSBs may be organized into synchronization signal burst sets to support beam sweeping. In some cases, each SSB within a burst set may be transmitted using a different beam, which may help a UE quickly acquire both transmit and receive beams (particular for mmW applications). A physical cell identity (PCI) may be decoded from the PSS and SSS of the SSB.

Further system information such as, remaining minimum system information (RMSI), system information blocks (SIBs), other system information (OSI) may be transmitted on a PDSCH in certain subframes.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be transmitted in different frequencies, and may include the different types of SSB.

In some implementations, SSB bursts may be used for beam management. Typical beam management procedures may entail a beam sweep across each of the beam directions that a network entity can perform transmissions on. The beam directions may, for example, cover 360 degrees around the network entity (e.g., base station) over a plurality of directions (e.g., 64 different beam directions). However, for any given UE, only a subset of these beams may be detected. For example, transmissions using a beam direction opposite of a direction from the network entity to the UE may not be received by the UE. Because only a subset of the beams may be detected, the network entity may waste network resources in performing a beam sweep across each of the plurality of directions, which may reduce the amount of resources available for other transmissions (e.g., data transmissions).

According to certain aspects of the present disclosure, beam management procedures may be enhanced (e.g., in FR2) using side-information and machine learning models. The side information may include, for example, UE position information, which may be latitude/longitude information from a satellite positioning system, time difference of arrival (TDOA), UE orientation information, and the like.

Aspects of the present disclosure provide techniques for modifying signal transmissions in response to detecting a conflict. For example, a conflict may arise between a higher priority downlink transmission scheduled for a UE and an existing SSB. In some aspects, the disclosed method detects the conflict and modifies transmission of one or more signals (e.g., reference signals, alternative SSB transmissions) in response to the detection. The UE may be notified regarding the modified signals. In some cases, the higher priority downlink transmission includes an ultra-reliable low latency communications (URLLC) PDSCH transmission. The disclosed techniques may be used, for example, to modify a conflicted SSB, e.g., by puncturing or swapping, such that the downlink transmission of higher priority can be properly received at the UE.

URLLC transmissions are often of higher priority than other transmissions. For example, NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting URLLC. These services may include latency and reliability requirements, with URLLC being the most demanding. These services may also have different transmission time intervals (TTI) to meet respective quality of service (QoS) requirements. In addition, these services may co-exist in the same subframe. Due to the different scheduling timelines for different services, resources allocated for a service may be used for (e.g., preempted by) a different service.

In the example of FIG. 3, a UE may identify four SSB transmissions in a two slot duration. For example, the UE may identify SSB 1 335-*a* will be transmitted in symbols 4 through 7, SSB 2 335-*b* will transmitted in symbols 8 through 11, SSB 3 335-*c* will be transmitted in symbols 16 through 19, and SSB 4 335-*d* will be transmitted in symbols 20 through 23. The base station may be configured to transmit SSB 1 335-*a* on downlink beam 320-*a*, SSB 2 335-*b* on downlink beam 320-*b*, SSB 3 335-*c* on downlink beam 320-*c*, and SSB 4 335-*d* on downlink beam 320-*d*.

As described with reference to FIG. 2, a base station may identify a downlink scheduling conflict 325. For example, the base station may identify downlink traffic (e.g., high priority traffic, URLLC traffic, URLLC PDSCH) to be transmitted in a position corresponding to one or more scheduled SSBs, where the high priority traffic is not QCLed with the one or more SSBs. The location of the high priority traffic to be transmitted may partially or fully overlap with the location of one or more SSBs transmissions. As such, the base station may cancel the one or more SSBs to transmit the high priority traffic. For example, a base station may identify traffic to transmit in symbols 12 through 17. Symbols 12 through 17 includes symbols 16 and 17 that are a part of SSB 3 335-*c*. Due to the partial overlap, the base station may cancel SSB 3 335-*c*.

In some implementations, the base station may identify a configuration to transmit one or more signals, such as reference signals (e.g., CSI-RSs) and/or one or more alternative SSB transmissions, to transmit as an alternative to the one or more canceled SSBs 335. For example, the base station may determine whether to configure the signal transmissions aperiodically or periodically and determine locations (e.g., symbol location) and durations (e.g., the number of symbols) for the one or more signals. The base station may transmit a message (e.g., DCI, MAC-CE, RRC) to a UE being served by the base station via wireless communications link or to another base station via a backhaul communication link that indicates information related to the one or more canceled SSBs and information related to the one or more signals being transmitted as an alternative to the one or more canceled SSBs.

Figure 4:
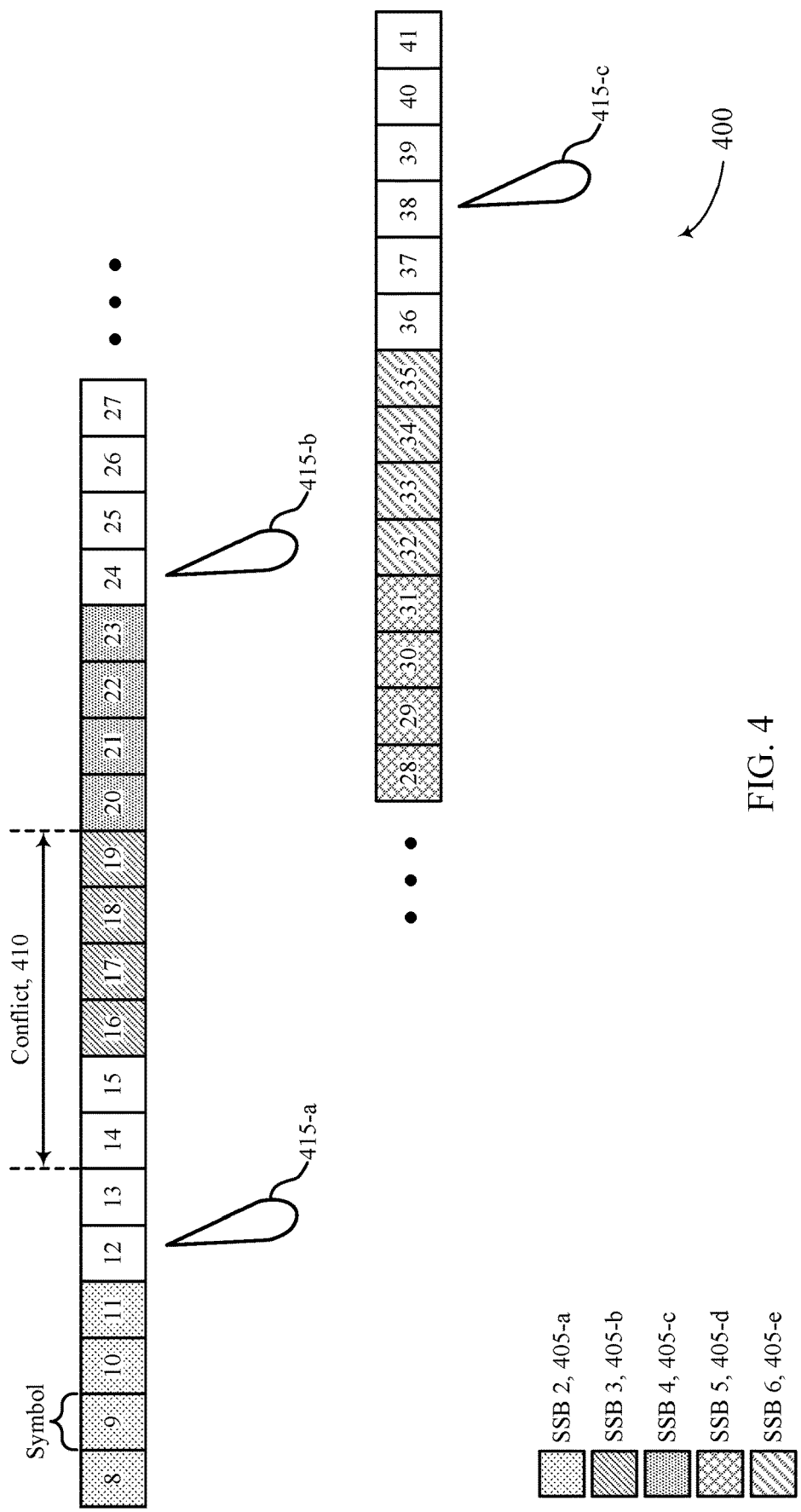

FIG. 4 illustrates an example of an SSB schedule 400 that supports indication methods for SSB configuration changes in accordance with aspects of the present disclosure. The SSB schedule 400 may be configured by a base station and identified by a UE, which may be examples of a base station and a UE as described with reference to FIGS. 1 through 3. In some cases, a base station may implement an SSB cancellation procedure that impacts the SSB schedule 400. Additionally or alternatively, other wireless devices, such as UE 115 may implement or participate in an SSB cancellation procedure that impacts the SSB schedule 400.

A base station may identify that downlink traffic (e.g., high priority traffic, URLLC traffic) may need to be scheduled in a location (e.g., time location such as a number of symbols, slots, of subframes) that has already been allocated to an SSB transmission 405. As described with reference to FIGS. 2 and 3, the base station may cancel the conflicting SSB 405 to transmit the downlink traffic and configure reference signal transmissions to be transmitted as an alternative to canceled SSBs 405. The base station may transmit, to a UE or base station, a message including information related to the canceled SSBs and information related to the alternative signals (e.g., reference signals, alternative SSB transmissions). The configuration of the signals may be based on the downlink traffic being aperiodic or periodic. For example, the base station may determine that downlink traffic is aperiodic such that the downlink traffic may interrupt one or more SSBs 405 for one duration. For example, the base station may determine that the aperiodic downlink traffic is to be transmitted in symbols 14 through 19 (e.g., conflict 410) which conflicts with one SSB 405 such as SSB 3 405-*b*. As such, the base station may cancel SSB 3 405-*b*. In another example, the base station may determine that the aperiodic traffic is to be transmitted in symbols 14 through 23 where two SSBs 405 such as SSB 3 405-*b* and SSB 4 405-*c* may conflict with the downlink traffic. As such, the base station may cancel SSB 3 405-*b* and SSB 4 405-*c*. Due to the aperiodic nature of the downlink traffic, the base station may configure one or more aperiodic signals (e.g., CSI-RSs, SSB transmissions) to transmit as an alternative to the canceled SSBs, where the number of alternative signals may be equal to the number of canceled SSBs 405. For example, in the case that one aperiodic SSB 405 is canceled, the base station may configure one aperiodic CSI-RS or SSB. In the case that two aperiodic SSBs 405 are canceled, the base station may configure two CSI-RSs or SSBs.

In another example, the base station may determine that downlink traffic is periodic such that the downlink traffic may interrupt one or more SSBs 405 multiple times. For example, the base station may determine that the periodic downlink traffic is to be transmitted in symbols 14 through 19 (e.g., conflict 410) which conflicts with one SSB 405 such as SSB 3 405-*b* and again during a second set of symbols which leads to a cancellation of another SSB 405. For example, SSB 6 405-*e* or some other SSB 405 may conflict with downlink traffic. As such, the base station may cancel SSB 3 405-*b*, SSB 6 405-*e*, and any other conflicting SSB 405. Due to the periodic nature of the downlink traffic, the base station may configure periodic signals (e.g., CSI-RSs, SSBs) to transmit as an alternative to each canceled SSB 405, where the number of alternative signals may be equal to the number of canceled SSBs 405. For example, in the case that two periodic SSBs 405 are canceled due to the periodic traffic, the base station may configure two periodic CSI-RS or SSBs.

The location of the aperiodic signals may be based on symbol availability. For example, the base station may determine that symbols 12 and 13 are empty and are not impacted by conflict 410 and determine to transmit aperiodic or periodic signals in either symbols 12 or 13. In some cases, the base station may schedule the signal in symbols 12 or 13 of any of the available symbols based on symbols 12 and 13 being the closest symbols to the symbols originally allocated to transmit the canceled SSB 405. For example, the base station may cancel SSB3 405-b in symbols 16 through 19 based on conflict 410, and schedule an alternative signal in symbol 12 or 13 based on symbol 12 or 13 being the closest empty symbols to symbols 16 through 19. The base station may transmit the signal in symbols 12 or 13 using beam 415-a which may be the same beam that was supposed to transmit the canceled SSB 405.

Additionally or alternatively, the base station may determine that symbols 24 through 27 are empty and are not impacted by conflict 410 and determine to transmit aperiodic or periodic signals in any of symbols 24, 25, 26, and 27. In some cases, the base station may schedule the signal in symbol 24 of symbols 24 through 27 based on symbol 24 being the closest symbol to the symbols originally allocated to transmit the canceled SSB. For example, the base station may cancel SSB 3 405-b in symbols 16 through 19 based on conflict 410, and schedule an alternative signal in symbol 24 based on symbol 24, or symbols 24 through 27, being the closest empty symbol to symbols 16 through 19. The base station may transmit the signal in symbols 24 through 27 using beam 415-b which may be the same beam that was supposed to transmit the canceled SSB.

Additionally or alternatively, the base station may determine that symbols 36 through 41 are empty and are not impacted by conflict 410 and determine to transmit aperiodic or periodic signals in any of symbols 36, 37, 38, 39, 40, or 41. In some cases, the signal scheduled in symbols 36 through 41 may be a periodic signal that is based on the placement of a previous periodic signal. For example, the signal scheduled in symbols 36 through 41 may be based on the location of the previously scheduled periodic signal in symbols 12 or 13 or based on the location of the previously scheduled periodic signal in symbols 24 through 27, or a combination thereof. The base station may transmit the signal in symbols 36 through 41 using beam 415-c which may be the same beam that was supposed to transmit the canceled SSB.

Figure 5:
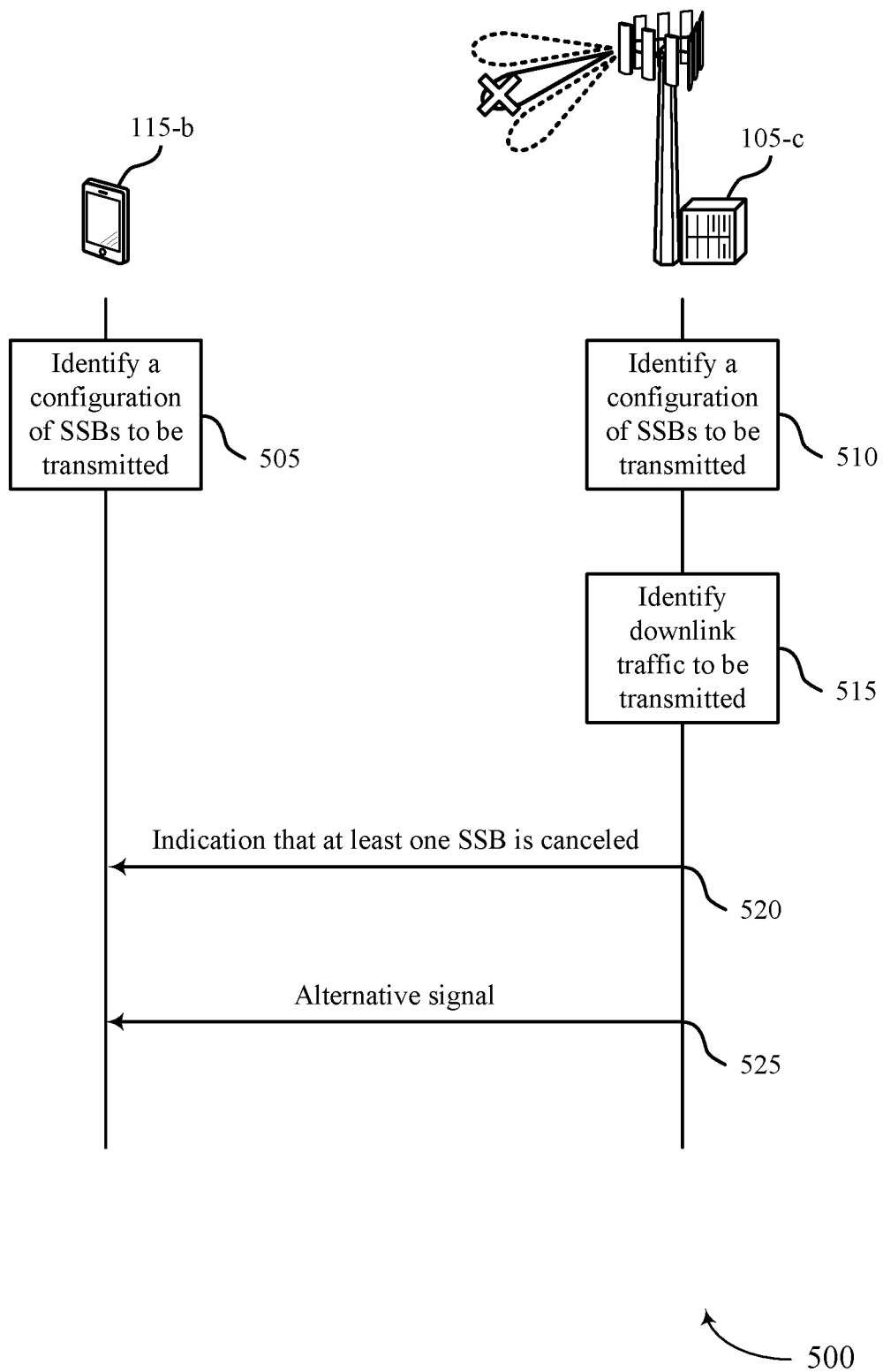
FIGS. 5 and 6 illustrate examples of process flows that support indication methods for SSB configuration changes in accordance with aspects of the present disclosure.

FIG. 5 illustrates an example of a process flow 500 that supports indication methods for SSB configuration changes in accordance with aspects of the present disclosure. The process flow 500 may illustrate an example SSB cancelation and indication procedure. For example, base station 105-c may cancel one or more SSBs and transmit an indication of the one or more canceled SSBs to UE 115-b, where base station 105-c may be the serving base station of UE 115-b. Base station 105-c and UE 115-b may be examples of the corresponding wireless devices described with reference to FIGS. 1 through 4. In some cases, instead of base station 105-c implementing the SSB cancellation and indication procedure, another base station or a different type of wireless device (e.g., a UE 115) may perform an SSB cancellation and indication procedure. Alternative examples of the following may be implemented, where some steps are performed in a different order than described or are not performed at all. In some cases, steps may include additional features not mentioned below, or further steps may be added.

In some cases, UE 115-c may detect a conflict, in time, between at least one SSB and a higher priority downlink transmission scheduled for UE 115-c. For example, the conflict arises when a higher priority downlink transmission, such as an URLLC PDSCH transmission, conflicts with an SSB.

In some implementations, a network entity (e.g., base station 105-d, base station 105-e) may modify transmission of the SSB in response to the detection. The network entity may notify UE 115-c regarding the modified SSB transmission. For example, the network entity may modify at least one of an SSB duration, an SSB periodicity, or number of SSB beams swept, in accordance to examples provided herein.

In some cases, the SSB may be modified due to a conflict with a higher priority downlink transmission. UE 115-c may adjust a measurement procedure involving the SSB based on the notification. In this manner, a UE 115 and base station 105 may be aligned regarding the modified SSB burst pattern, for example, allowing the UE 115 to save power by reducing monitoring time and/or allowing the UE 115 to receive downlink data during portions of an SSB burst that are no longer used for SSBs.

In some cases, modifying the conflicted SSB may include puncturing or cancelling the SSB. In some cases, because all connected UEs 115 may need to be notified about the affected SSB, the UEs 115 may be notified by a group-based DCI. In such cases, the group-based DCI includes a bitmap that indicates a position of the affected SSB. The bitmap may be, for example a 64-bit bitmap where each bit corresponds to one of 64 SSBs. The group-based DCI may also indicate a duration for which the SSB transmission is modified.

In some aspects, the group-based DCI also includes a cell identification (ID) of the network entity, so that the information about the modified SSB may be transmitted to one or more neighbor cells (e.g., neighbor base stations 105). For example, UEs 115 from neighbor cells that measure SSBs from the cell of the known cell ID of the group-based DCI may use the information about the modified SSB to freeze or reset filtering for L3 mobility measurement, etc.

In some cases, modifying the conflicted SSB may include swapping the conflicted SSB with another SSB that is QCLed with the URLLC PDSCH. For example, an SSB (not QCLed with the URLLC PDSCH) may be swapped with a second SSB (that is QCLed with the URLLC PDSCH).

In some cases, the URLLC PDSCH, may be rate matched around the second SSB (which may be possible as they are QCLed). Alternatively, the higher priority downlink transmission and the second SSB may be transmitted with frequency division multiplexing (FDM).

In some examples, the UE 115 (and other, or all, connected UEs 115) may be notified using a group-based DCI that indicates the swap of the conflicting SSB with the different SSB (second SSB). In such cases, the group-based DCI may indicate multiple swaps of SSBs. For example, a number (N) of pairs of swaps may be included. For each pair (x, y), a total of ceil(log 2(M))+ceil(log 2(M)) bits are needed for 0<x, y<M, x and y are indices of the swapped SSB pair, M is the total number of SSB positions/beams.

In some cases, the duration of the changed SSB beam pattern may also be included in the DCI. The group-based DCI may also include a cell ID of the network entity, so that the modified SSB information can be sent to neighbor cells.

For example, at 505, UE 115-b may identify a configuration of a set of SSBs to be transmitted by base station 105-c. At 510, base station 105-c may identify a configuration of a set of SSBs to be transmitted by base station 105-c. The configuration of steps 505 and 510 may be the same configurations, and steps 505 and 510 may occur in any order.

At 515, base station 105-*c* may identify that downlink traffic (e.g., high priority traffic, URLLC traffic, URLLC PDSCH) is to be transmitted on resources indicated by the identified configuration for at least one SSB of the set of SSBs. For example, the downlink traffic may be scheduled to be transmitted in one or more symbols that overlap with one or more symbols that allocated for SSB transmission. As such, UE 115-*b* may receive the URLLC traffic on resources indicated by the configuration for the canceled at least one SSB.

At 520, UE 115-*b* may receive, from base station 105-*c*, a message indicating that a transmission of at least one SSB of the set of SSBs is canceled and indicating resources for a signal (e.g., reference signal, alternative SSB) to be transmitted by base station 105-*c* as an alternative to the canceled at least one SSB. In some cases, UE 115-*b* may receive, in the message and for each SSB of the canceled at least one SSB, an index (e.g., an index within a configured SSB set) or a resource location associated with the canceled at least one SSB (e.g., time, frequency, or both time and frequency resources that overlap at least in part with the canceled SSB). UE 115-*b* may identify, based on or in response to the received message, a duration (e.g., a number of slots, subframes, frames, etc., in whole or parts) for which the at least one SSB is canceled. The duration may be preconfigured, or semi-statically configured via RRC, MAC-CE, or other control signaling. The UE may determine the duration based on an explicit indication of the direction, for example by a configuration field indicating the cancellation duration for canceled SSBs. In other examples, the duration may be implicitly determined by associated with another duration value for another parameter. In some cases, the received message includes an indication of the duration (e.g., a number of slots, subframes, frames, etc., in whole or parts) for which the SSBs are canceled. In some cases, UE 115-*b* may receive DCI that includes the message indicating that the transmission of at least one SSB is canceled and indicating the resources for the signal to be transmitted. The DCI may be UE-specific DCI or group-specific DCI. The indicated resources for the reference signal may be different from resources indicated by the configuration for the canceled at least one SSB indicated by the configuration of the plurality of SSB. The indicated resources may be different in time (e.g., in different symbols, slots, mini-slots, subframes, etc.), or frequency (e.g., subcarriers, resource blocks, etc.), or both.

At 525, UE 115-*b* may receive, based on the received message, the signal using the indicated resources. In some cases, the signal is a CSI-RS or use a same sequence as a CSI-RS, though other reference signals types may also be used. In some cases, the signal is an alternative SSB transmissions. The signal (e.g., a CSI-RS, SSB transmission) may be periodically or aperiodically configured. UE 115-*b* may perform a measurement procedure of the received signal, where the measurement procedure includes one or more of an L1 measurement procedure or an L3 mobility measurement procedure. UE 115-*b* may transmit, to base station 105-*c*, a measurement report indicating a result of the performed measurement procedure. In some cases, UE 115-*b* may perform the measurement procedure of the received signal and one or more SSBs of the set of SSBs.

Figure 6:
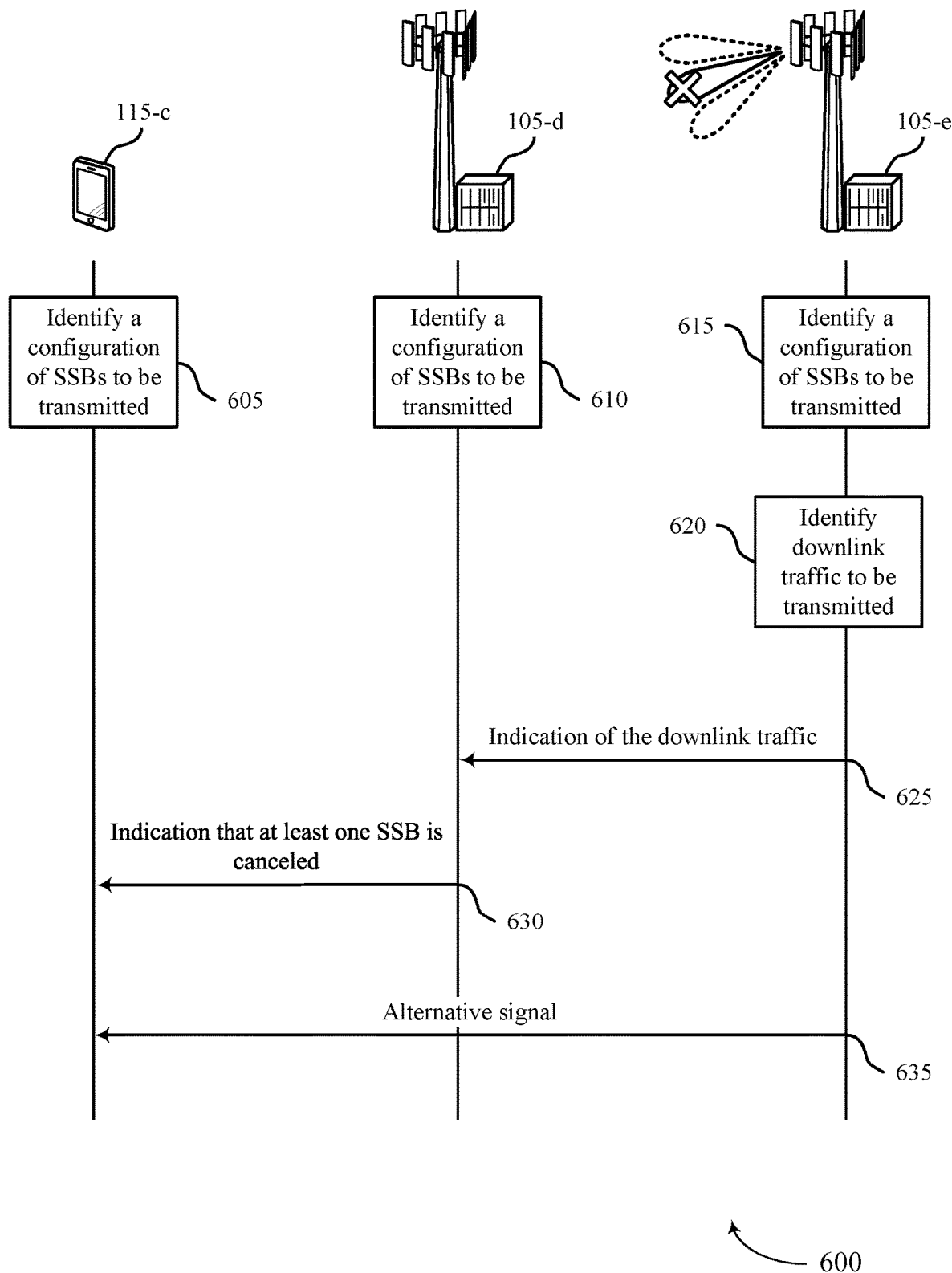

FIG. 6 illustrates an example of a process flow 600 that supports indication methods for SSB configuration changes in accordance with aspects of the present disclosure. The process flow 600 may illustrate an example SSB cancelation and indication procedure. For example, base station 105-*e* may cancel one or more SSBs and transmit an indication of the one or more canceled SSBs to base station 105-*d*, where base station 105-*d* may be the serving base station of UE 115-*c* and base station 105-*e* is a non-serving base station 105 (e.g., neighboring base station 105). Base stations 105-*d* and 105-*e* and UE 115-*c* may be examples of the corresponding wireless devices described with reference to FIGS. 1 through 5. In some cases, instead of base station 105-*e* implementing the SSB cancellation and indication procedure, another base station (e.g., base station 105-*d*) or a different type of wireless device (e.g., a UE 115) may perform an SSB cancellation and indication procedure. Alternative examples of the following may be implemented, where some steps are performed in a different order than described or are not performed at all. In some cases, steps may include additional features not mentioned below, or further steps may be added.

At 605, UE 115-*c* may identify a configuration of a set of SSBs to be transmitted by base station 105-*e*. At 610, base station 105-*d* may identify a configuration of a set of SSBs to be transmitted by base station 105-*e*. This configuration may indicate a SSB-based radio resource management (RRM) Measurement Timing Configuration window (SMTC window), for example as indicated by a timing offset and duration, as well as frequency resources for the SSBs, and the SSB subcarrier spacing. At 615, base station 105-*e* may identify a configuration of a set of SSBs to be transmitted by base station 105-*e*. In some examples, the set of SSBs The configuration of steps 605, 610, and 615 may be the same configurations and steps 605, 610, and 615 may occur in any order.

At 620, base station 105-*e* may identify that downlink traffic (e.g., high priority traffic, URLLC traffic, URLLC PDSCH) is to be transmitted on resources indicated by the identified configuration for at least one SSB of the set of SSBs. For example, the downlink traffic may be scheduled to be transmitted in one or more symbols that overlap with one or more symbols that allocated for SSB transmission.

At 625, base station 105-*e* may transmit (e.g., on a backhaul link, such as an Xn link), to base station 105-*d*, an indication that downlink traffic is to be transmitted by base station 105-*e* on resources indicated by the identified configuration for at least one SSB of the plurality of SSBs. In some cases, the indication may include a message indicating (e.g., based on an index within the configured SSB set for neighbor cell measurements) that a transmission of the at least one SSB (e.g., time, frequency, or both time and frequency resources that overlap at least in part with the canceled SSB) of the set of SSBs by the base station 105-*e* is canceled and indicating resources for a signal (e.g., reference signal, SSB) to be transmitted by base station 105-*e* as an alternative to the canceled at least one SSB. Base station 105-*d* may identify, based on identified downlink traffic, a duration (e.g., a number of slots, subframes, frames, etc., in whole or parts) for which the at least one SSB is canceled. In some cases, base station 105-*e* and base station 105-*d* may communicate via a backhaul communications link (e.g., Xn link).

At 630, base station 105-*d* may relay the message from base station 105-*e* to UE 115-*c*. For example, base station 105-*d* may transmit, to UE 115-*c*, a message indicating that a transmission of the at least one SSB of the set of SSBs by the base station 105-*e* is canceled and indicating resources for a signal to be transmitted by base station 105-*e* as an alternative to the canceled at least one SSB. In some cases, UE 115-*c* may receive, in the message and for each SSB of the canceled at least one SSB, an index or a resource location associated with the canceled at least one SSB. UE 115-*c* may identify, based on the received message, a duration for which the at least one SSB is canceled. In some cases, the received message includes an indication of the duration for which the SSBs are canceled. The duration may be preconfigured, or semi-statically configured via RRC, MAC-CE, or other control signaling. The UE may determine the duration based on an explicit indication of the direction, for example by a configuration field indicating the cancellation duration for canceled SSBs. In other examples, the duration may be implicitly determined by associated with another duration value for another parameter. In some cases, UE 115-c may receive an RRC transmission that includes the message indicating that the transmission of the at least one SSB is canceled and indicating the resources for the signal to be transmitted. The indicated resources for the signal may be different from resources indicated by the configuration for the canceled at least one SSB indicated by the configuration of the plurality of SSB. The indicated resources may be different in time (e.g., in different symbols, slots, mini-slots, subframes, etc.), or frequency (e.g., subcarriers, resource blocks, etc.), or both.

At 635, UE 115-c may receive, from base station 105-e, based on the received message, the signal using the indicated resources. In some cases, the signal is a CSI-RS, or may use a same sequence as a CSI-RS, though other reference signals types may also be used. In some cases, the signal is an alternative SSB transmission. The signal (e.g., CSI-RS, SSB transmission) may be periodically or aperiodically configured. UE 115-c may perform a measurement procedure of the received signal, where the measurement procedure includes an L3 mobility measurement procedure. UE 115-c may transmit, to base station 105-d, a measurement report indicating a result of the performed measurement procedure. In some cases, UE 115-b may perform the measurement procedure of the received signal and one or more SSBs of the set of SSBs.

Figure 7:
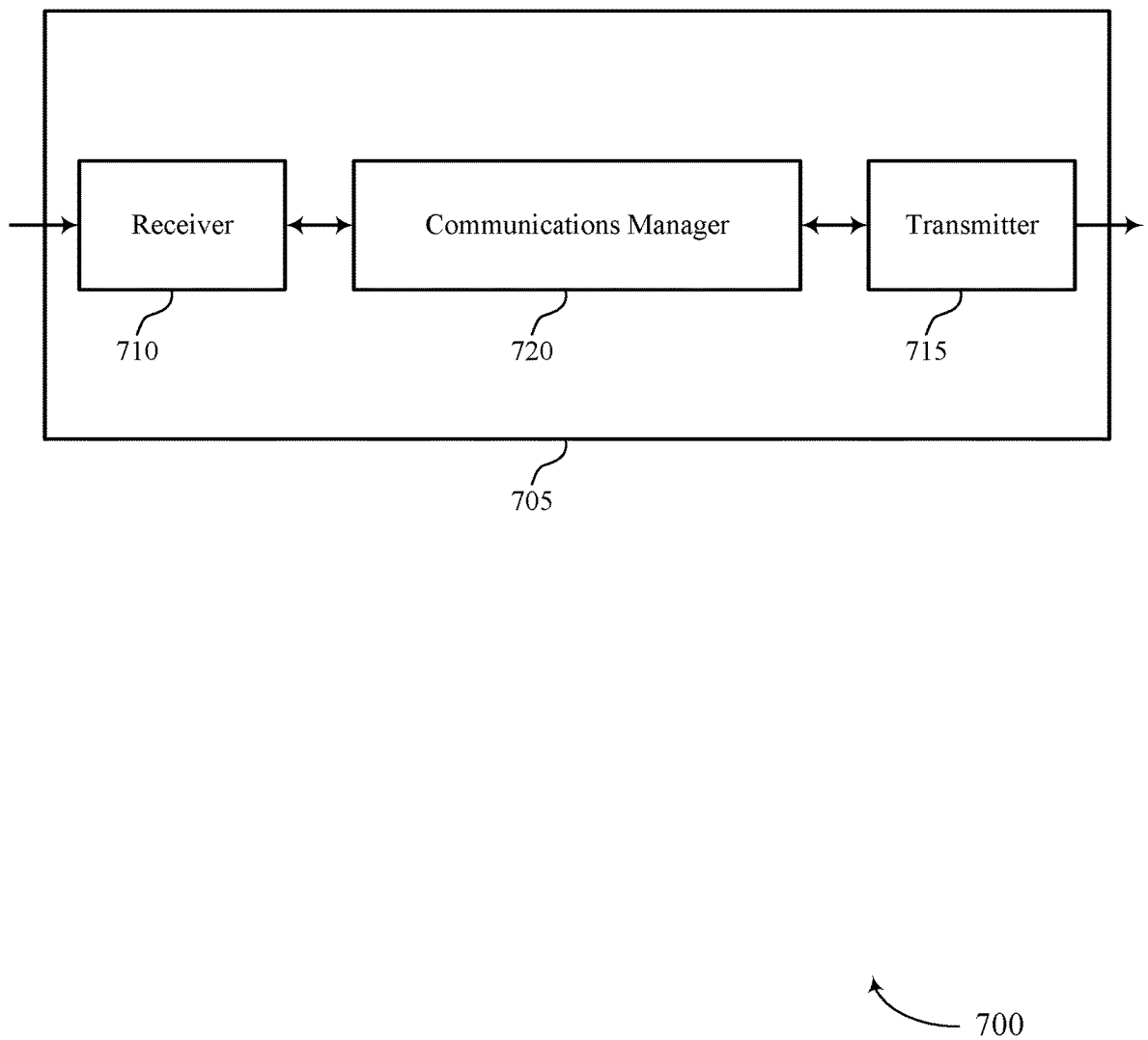
FIGS. 7 and 8 show block diagrams of devices that support indication methods for SSB configuration changes in accordance with aspects of the present disclosure.

FIG. 7 shows a block diagram 700 of a device 705 that supports indication methods for SSB configuration changes in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to indication methods for SSB configuration changes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to indication methods for SSB configuration changes). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of indication methods for SSB configuration changes as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for identifying a configuration of a set of multiple SSBs to be transmitted by a first base station. The communications manager 720 may be configured as or otherwise support a means for receiving, from the first base station or a second base station, a message indicating that a transmission of at least one SSB of the set of multiple SSBs is canceled and indicating resources for a signal to be transmitted by the first base station as an alternative to the canceled at least one SSB. The communications manager 720 may be configured as or otherwise support a means for receiving, based on the received message, the signal using the indicated resources.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for increased reliability and efficiency in the measurement of downlink channels.

Figure 8:
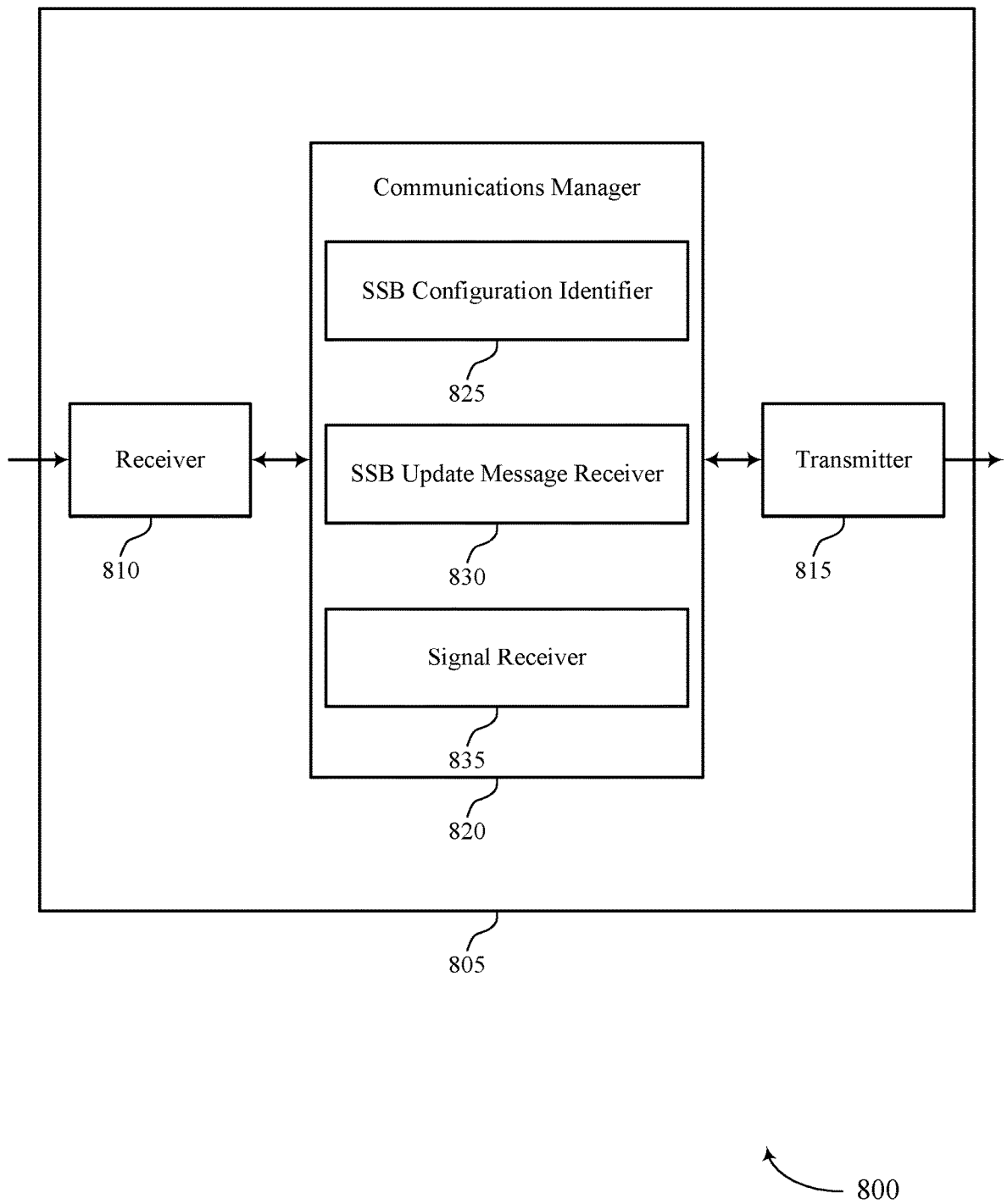

FIG. 8 shows a block diagram 800 of a device 805 that supports indication methods for SSB configuration changes in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to indication methods for SSB configuration changes). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to indication methods for SSB configuration changes). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of indication methods for SSB configuration changes as described herein. For example, the communications manager 820 may include an SSB configuration identifier 825, an SSB update message receiver 830, a signal receiver 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The SSB configuration identifier 825 may be configured as or otherwise support a means for identifying a configuration of a set of multiple SSBs to be transmitted by a first base station. The SSB update message receiver 830 may be configured as or otherwise support a means for receiving, from the first base station or a second base station, a message indicating that a transmission of at least one SSB of the set of multiple SSBs is canceled and indicating resources for a signal to be transmitted by the first base station as an alternative to the canceled at least one SSB. The signal receiver 835 may be configured as or otherwise support a means for receiving, based on the received message, the signal using the indicated resources.

Figure 9:
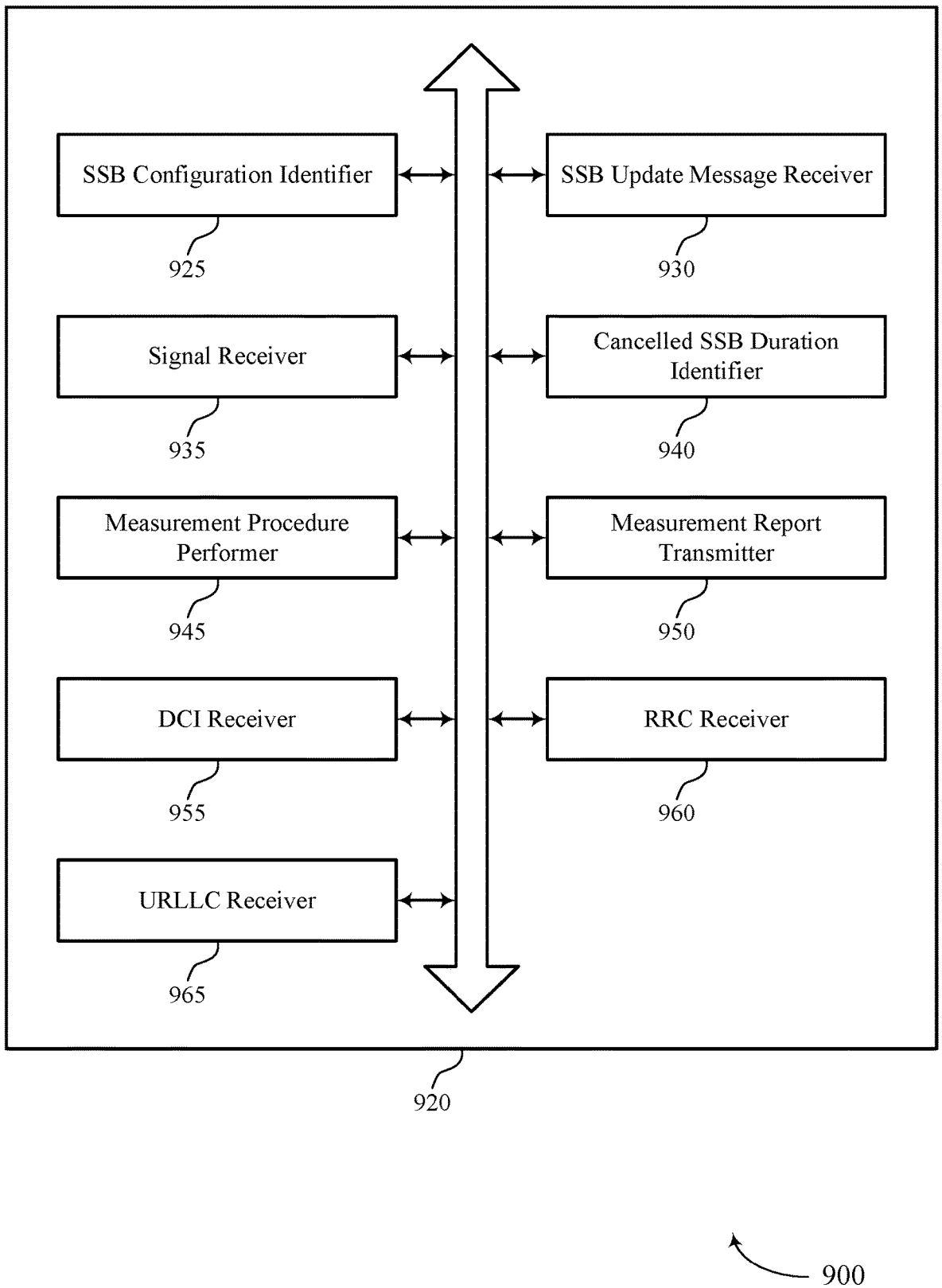
FIG. 9 shows a block diagram of a communications manager that supports indication methods for SSB configuration changes in accordance with aspects of the present disclosure.

FIG. 9 shows a block diagram 900 of a communications manager 920 that supports indication methods for SSB configuration changes in accordance with aspects of the present disclosure. The communications manager 920 may be an example of aspects of a communications manager 720, a communications manager 820, or both, as described herein. The communications manager 920, or various components thereof, may be an example of means for performing various aspects of indication methods for SSB configuration changes as described herein. For example, the communications manager 920 may include an SSB configuration identifier 925, an SSB update message receiver 930, a signal receiver 935, a canceled SSB duration identifier 940, a measurement procedure performer 945, a measurement report transmitter 950, a DCI receiver 955, an RRC receiver 960, an URLLC receiver 965, or any combination thereof. Each of these components may communicate, directly or indirectly, with one another (e.g., via one or more buses).

The communications manager 920 may support wireless communications at a UE in accordance with examples as disclosed herein. The SSB configuration identifier 925 may be configured as or otherwise support a means for identifying a configuration of a set of multiple SSBs to be transmitted by a first base station. The SSB update message receiver 930 may be configured as or otherwise support a means for receiving, from the first base station or a second base station, a message indicating that a transmission of at least one SSB of the set of multiple SSBs is canceled and indicating resources for a signal to be transmitted by the first base station as an alternative to the canceled at least one SSB. The signal receiver 935 may be configured as or otherwise support a means for receiving, based on the received message, the signal using the indicated resources.

In some examples, to support receiving the message indicating that the transmission of the at least one SSB is canceled, the SSB update message receiver 930 may be configured as or otherwise support a means for receiving, in the message and for each SSB of the canceled at least one SSB, an index or a resource location associated with the canceled at least one SSB.

In some examples, the canceled SSB duration identifier 940 may be configured as or otherwise support a means for receiving, in the message, an indication of a duration for which the at least one SSB is canceled.

In some examples, the signal is a CSI-RS. In some examples, the resources for the CSI-RS are periodically or aperiodically configured. In some examples, the signal is an alternative SSB. In some examples, the at least one SSB is canceled based on ultra-reliable low latency communication traffic being scheduled on resources for the at least one SSB. In some examples, the alternative SSB is quasi co-located with the ultra-reliable low latency communication traffic.

In some examples, the message is received from the first base station and the first base station is a serving base station of the UE, and the signal receiver 935 may be configured as or otherwise support a means for receiving, from the first base station, the signal using the indicated resources. In some examples, the message is received from the first base station and the first base station is a serving base station of the UE, and the measurement procedure performer 945 may be configured as or otherwise support a means for performing a measurement procedure of the received signal and the one or more SSBs of the set of multiple SSBs, the measurement procedure including one or more of a layer one measurement procedure or a layer three mobility measurement procedure. In some examples, the message is received from the first base station and the first base station is a serving base station of the UE, and the measurement report transmitter 950 may be configured as or otherwise support a means for transmitting, to the first base station, a measurement report indicating a result of the performed measurement procedure.

In some examples, the message is received from the second base station and the second base station is a serving base station of one or more neighbor UEs, and the signal receiver 935 may be configured as or otherwise support a means for receiving, from the first base station, the signal using the indicated resources. In some examples, the message is received from the second base station and the second base station is a serving base station of one or more neighbor UEs, and the measurement procedure performer 945 may be configured as or otherwise support a means for performing a measurement procedure of the received signal and one or more SSBs of the set of multiple SSBs, the measurement procedure including a layer three mobility measurement procedure. In some examples, the message is received from the second base station and the second base station is a serving base station of one or more neighbor UEs, and the measurement report transmitter 950 may be configured as or otherwise support a means for transmitting, to the second base station, a measurement report indicating a result of the performed measurement procedure.

In some examples, to support receiving the message, the DCI receiver 955 may be configured as or otherwise support a means for receiving, from the first base station, group-based DCI that includes the message indicating that the transmission of at least one SSB is canceled and indicating the resources for the signal to be transmitted.

In some examples, the group-based DCI includes a cell identification (ID) of the first base station.

In some examples, to support receiving the message, the RRC receiver 960 may be configured as or otherwise support a means for receiving, from the second base station, an RRC transmission that includes the message indicating that the transmission of at least one SSB is canceled and indicating the resources for the signal to be transmitted.

In some examples, the indicated resources for the signal are different from resources indicated by the configuration for the canceled at least one SSB indicated by the configuration of the set of multiple SSBs.

In some examples, the at least one SSB is canceled based on ultra-reliable low latency communication traffic being scheduled on resources indicated by the configuration for the at least one SSB, and the URLLC receiver 965 may be configured as or otherwise support a means for receiving the ultra-reliable low latency communication traffic on the resources.

In some examples, the URLLC receiver 965 may be configured as or otherwise support a means for rate matching the ultra-reliable low latency communication traffic around the signal. In some examples, the URLLC receiver 965 may be configured as or otherwise support a means for receiving the ultra-reliable low latency communication traffic and the signal via frequency division multiplexing.

Figure 10:
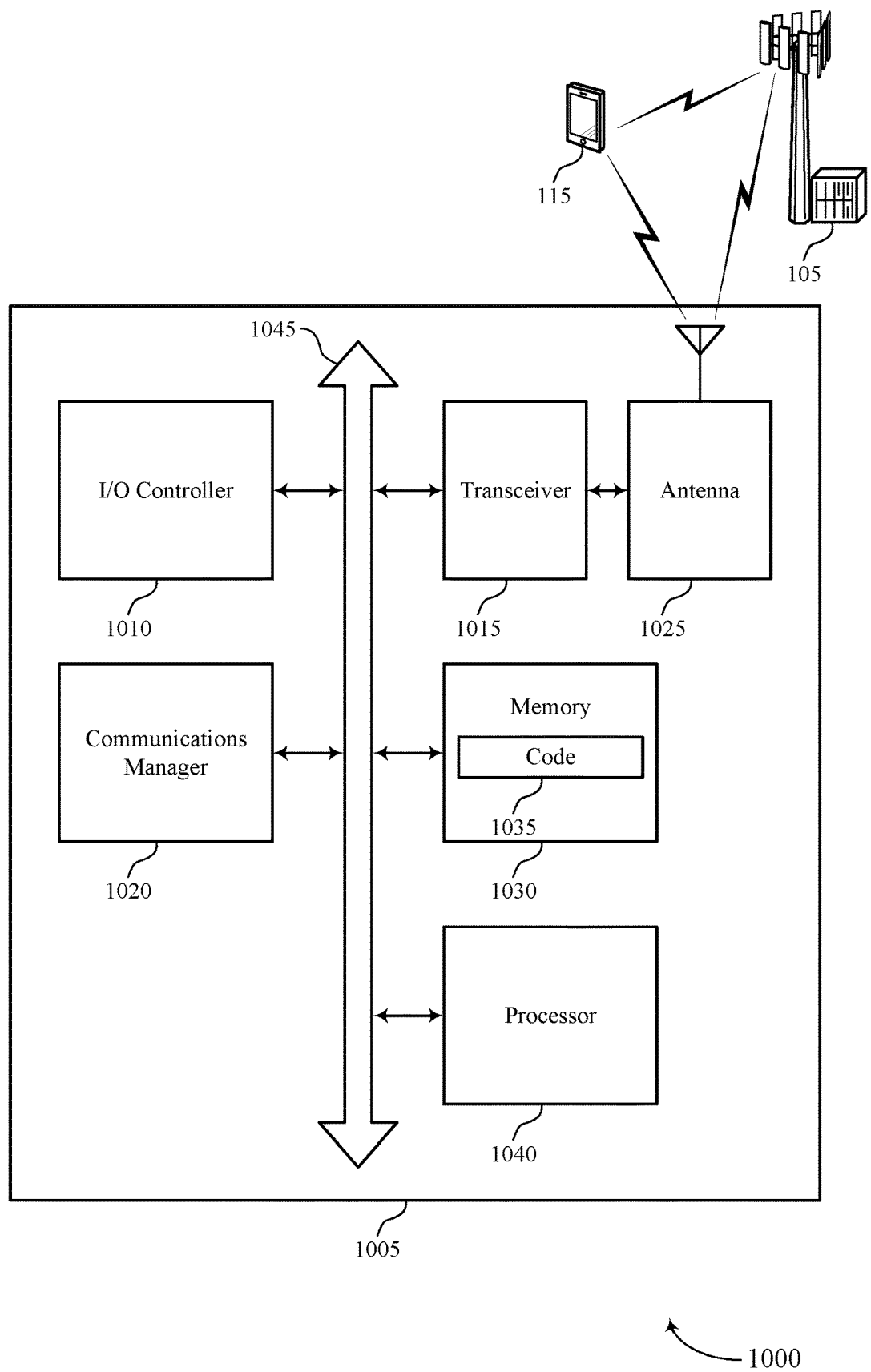
FIG. 10 shows a diagram of a system including a device that supports indication methods for SSB configuration changes in accordance with aspects of the present disclosure.

FIG. 10 shows a diagram of a system 1000 including a device 1005 that supports indication methods for SSB configuration changes in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting indication methods for SSB configuration changes). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for identifying a configuration of a set of multiple SSBs to be transmitted by a first base station. The communications manager 1020 may be configured as or otherwise support a means for receiving, from the first base station or a second base station, a message indicating that a transmission of at least one SSB of the set of multiple SSBs is canceled and indicating resources for a signal to be transmitted by the first base station as an alternative to the canceled at least one SSB. The communications manager 1020 may be configured as or otherwise support a means for receiving, based on the received message, the signal using the indicated resources.

By including or configuring the communications manager 1020 in accordance with examples as described herein, the device 1005 may support techniques for improved communication reliability, reduced latency, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of indication methods for SSB configuration changes as described herein, or the processor 1040 and the memory 1030 may be otherwise configured to perform or support such operations.

Figure 11:
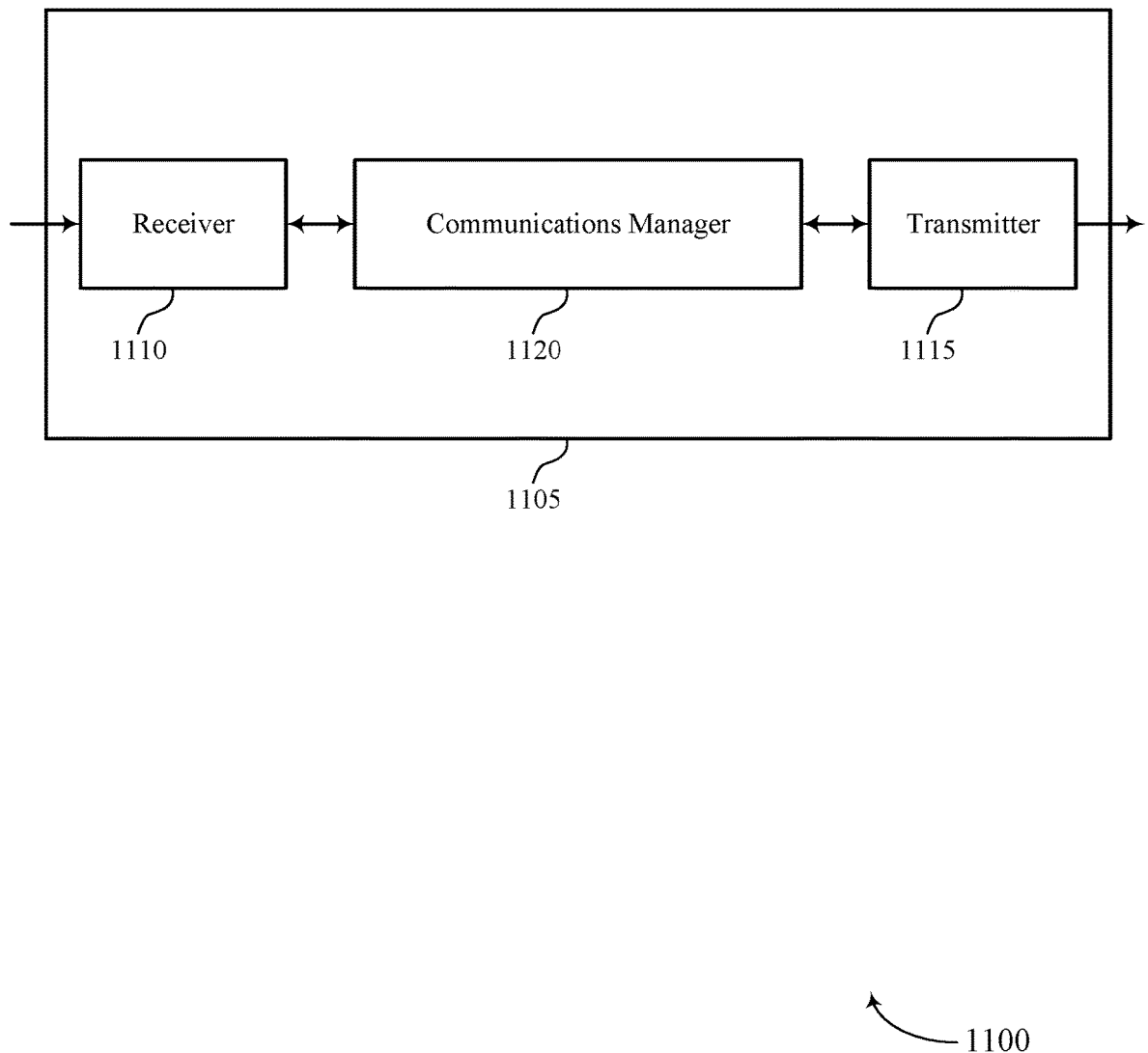
FIGS. 11 and 12 show block diagrams of devices that support indication methods for SSB configuration changes in accordance with aspects of the present disclosure.

FIG. 11 shows a block diagram 1100 of a device 1105 that supports indication methods for SSB configuration changes in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to indication methods for SSB configuration changes). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to indication methods for SSB configuration changes). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of indication methods for SSB configuration changes as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a first base station in accordance with examples as disclosed herein. For example, the communications manager 1120 may be configured as or otherwise support a means for identifying a configuration of a set of multiple SSBs to be transmitted by the first base station. The communications manager 1120 may be configured as or otherwise support a means for identifying that downlink traffic is to be transmitted on resources indicated by the identified configuration for at least one SSB of the set of multiple SSBs. The communications manager 1120 may be configured as or otherwise support a means for transmitting a message indicating that a transmission of the at least one SSB of the set of multiple SSBs is canceled and indicating resources for a signal to be transmitted by the first base station as an alternative to the canceled at least one SSB. The communications manager 1120 may be configured as or otherwise support a means for transmitting, based on the received message, the signal using the indicated resources.

Additionally or alternatively, the communications manager 1120 may support wireless communications at a first base station in accordance with examples as disclosed herein. For example, the communications manager 1120 may be configured as or otherwise support a means for identifying a configuration of a set of multiple SSBs to be transmitted by a second base station. The communications manager 1120 may be configured as or otherwise support a means for receiving, from the second base station, an indication that downlink traffic is to be transmitted by the second base station on resources indicated by the identified configuration for at least one SSB of the set of multiple SSBs. The communications manager 1120 may be configured as or otherwise support a means for transmitting, to a UE served by the first base station, a message indicating that a transmission of the at least one SSB of the set of multiple SSBs by the second base station is canceled and indicating resources for a signal to be transmitted by the second base station as an alternative to the canceled at least one SSB.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for increased reliability and efficiency in the measurement of downlink channels.

Figure 12:
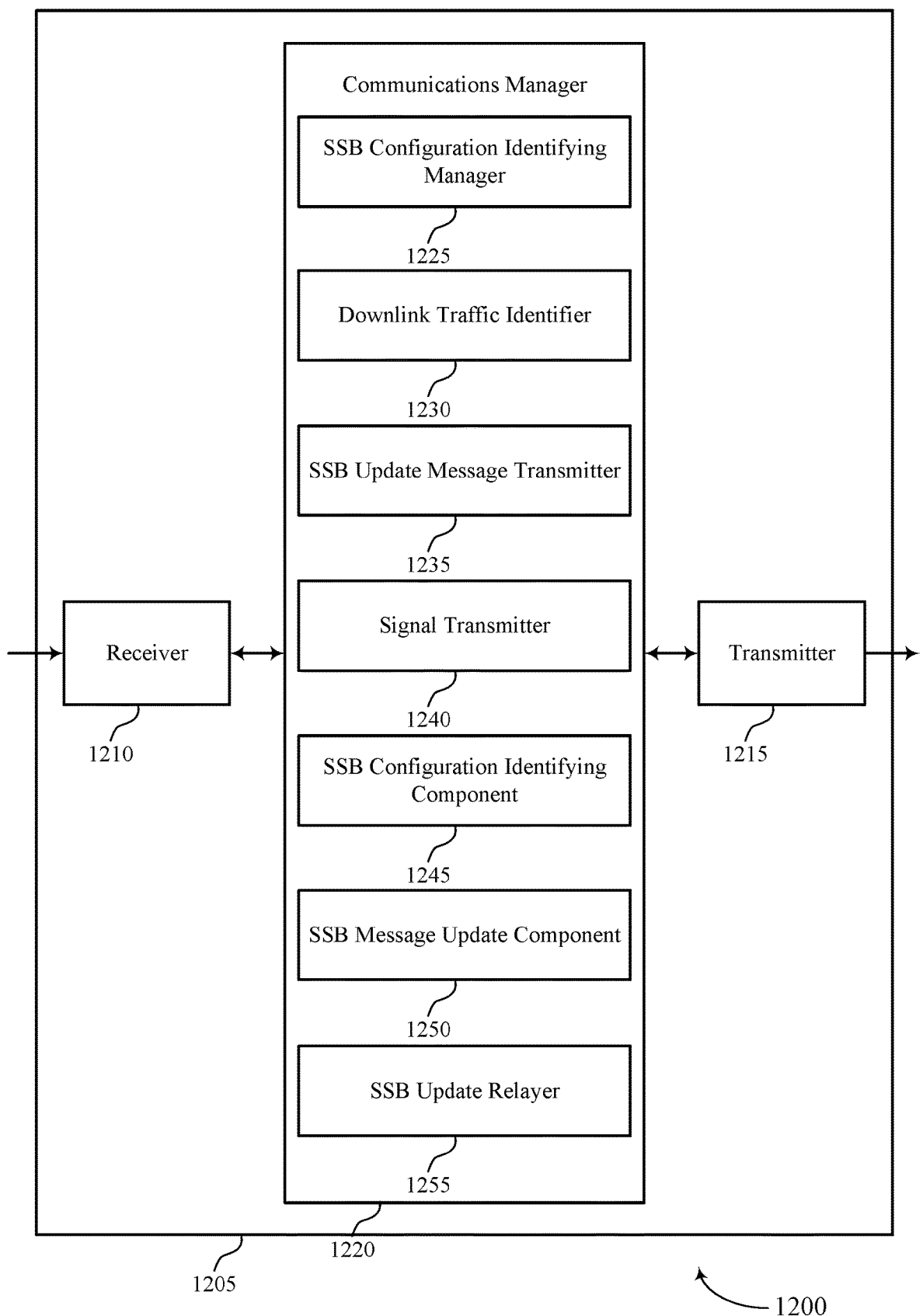

FIG. 12 shows a block diagram 1200 of a device 1205 that supports indication methods for SSB configuration changes in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to indication methods for SSB configuration changes). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to indication methods for SSB configuration changes). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of indication methods for SSB configuration changes as described herein. For example, the communications manager 1220 may include an SSB configuration identifying manager 1225, a downlink traffic identifier 1230, an SSB update message transmitter 1235, a signal transmitter 1240, an SSB configuration identifying component 1245, an SSB message update component 1250, an SSB update relayer 1255, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a first base station in accordance with examples as disclosed herein. The SSB configuration identifying manager 1225 may be configured as or otherwise support a means for identifying a configuration of a set of multiple SSBs to be transmitted by the first base station. The downlink traffic identifier 1230 may be configured as or otherwise support a means for identifying that downlink traffic is to be transmitted on resources indicated by the identified configuration for at least one SSB of the set of multiple SSBs. The SSB update message transmitter 1235 may be configured as or otherwise support a means for transmitting a message indicating that a transmission of the at least one SSB of the set of multiple SSBs is canceled and indicating resources for a signal to be transmitted by the first base station as an alternative to the canceled at least one SSB. The signal transmitter 1240 may be configured as or otherwise support a means for transmitting, based on the received message, the signal using the indicated resources.

Additionally or alternatively, the communications manager 1220 may support wireless communications at a first base station in accordance with examples as disclosed herein. The SSB configuration identifying component 1245 may be configured as or otherwise support a means for identifying a configuration of a set of multiple SSBs to be transmitted by a second base station. The SSB message update component 1250 may be configured as or otherwise support a means for receiving, from the second base station, an indication that downlink traffic is to be transmitted by the second base station on resources indicated by the identified configuration for at least one SSB of the set of multiple SSBs. The SSB update relayer 1255 may be configured as or otherwise support a means for transmitting, to a UE served by the first base station, a message indicating that a transmission of the at least one SSB of the set of multiple SSBs by the second base station is canceled and indicating resources for a signal to be transmitted by the second base station as an alternative to the canceled at least one SSB.

Figure 13:
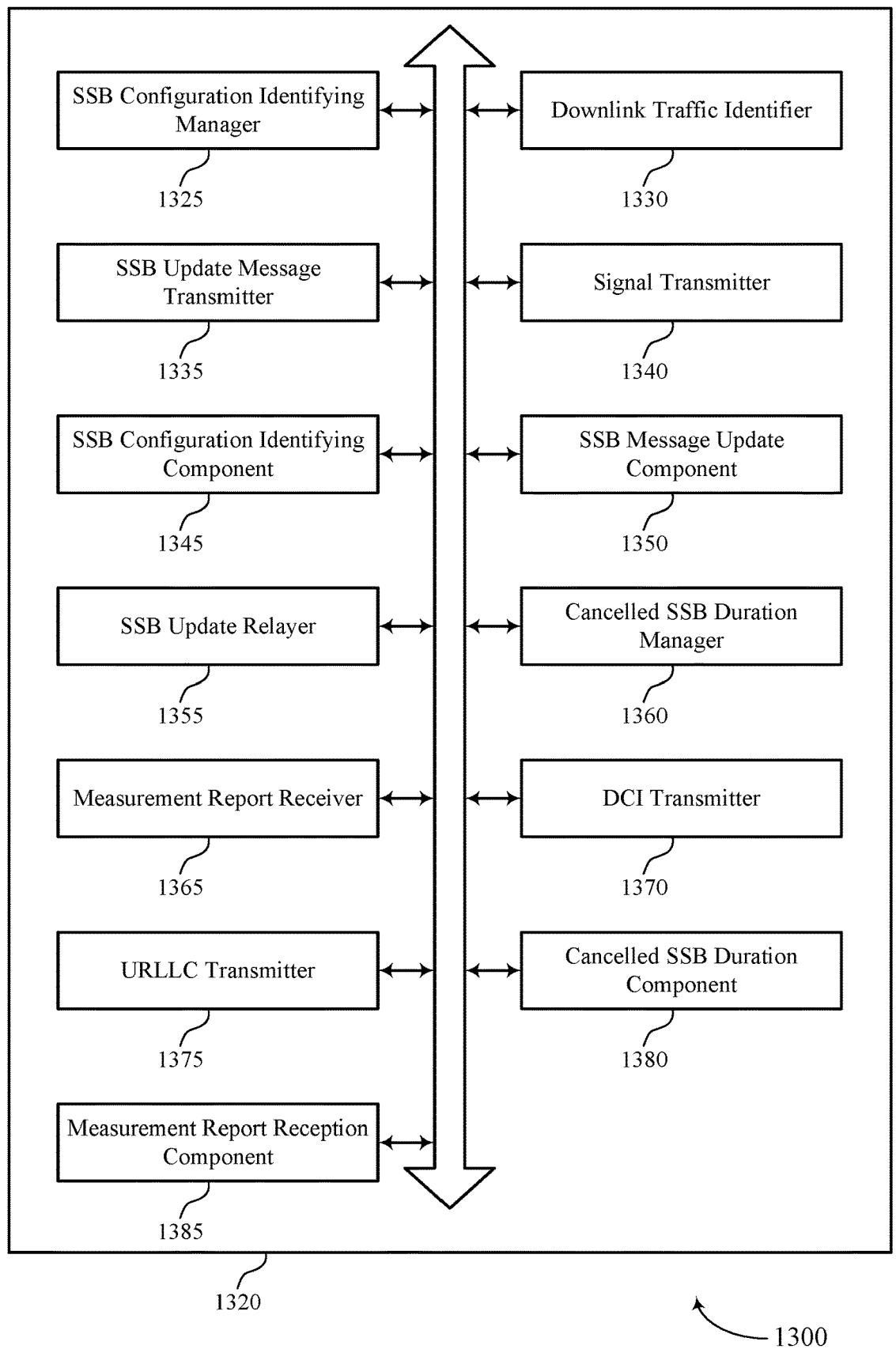
FIG. 13 shows a block diagram of a communications manager that supports indication methods for SSB configuration changes in accordance with aspects of the present disclosure.

FIG. 13 shows a block diagram 1300 of a communications manager 1320 that supports indication methods for SSB configuration changes in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of indication methods for SSB configuration changes as described herein. For example, the communications manager 1320 may include an SSB configuration identifying manager 1325, a downlink traffic identifier 1330, an SSB update message transmitter 1335, a signal transmitter 1340, an SSB configuration identifying component 1345, an SSB message update component 1350, an SSB update relayer 1355, a canceled SSB duration manager 1360, a measurement report receiver 1365, a DCI transmitter 1370, an URLLC transmitter 1375, a canceled SSB duration component 1380, a measurement report reception component 1385, or any combination thereof. Each of these components may communicate, directly or indirectly, with one another (e.g., via one or more buses).

The communications manager 1320 may support wireless communications at a first base station in accordance with examples as disclosed herein. The SSB configuration identifying manager 1325 may be configured as or otherwise support a means for identifying a configuration of a set of multiple SSBs to be transmitted by the first base station. The downlink traffic identifier 1330 may be configured as or otherwise support a means for identifying that downlink traffic is to be transmitted on resources indicated by the identified configuration for at least one SSB of the set of multiple SSBs. The SSB update message transmitter 1335 may be configured as or otherwise support a means for transmitting a message indicating that a transmission of the at least one SSB of the set of multiple SSBs is canceled and indicating resources for a signal to be transmitted by the first base station as an alternative to the canceled at least one SSB. The signal transmitter 1340 may be configured as or otherwise support a means for transmitting, based on the received message, the signal using the indicated resources.

In some examples, to support transmitting the message indicating that the transmission of the at least one SSB is canceled, the SSB update message transmitter 1335 may be configured as or otherwise support a means for transmitting, in the message and for each SSB of the canceled at least one SSB, an index or a resource location associated with the canceled at least one SSB.

In some examples, the canceled SSB duration manager 1360 may be configured as or otherwise support a means for transmitting, in the message, an indication of a duration for which the at least one SSB is canceled.

In some examples, the signal is a CSI-RS. In some examples, the resources for the CSI-RS are periodically or aperiodically configured. In some examples, the signal is an alternative SSB.

In some examples, the at least one SSB is canceled based on ultra-reliable low latency communication traffic being scheduled on resources for the at least one SSB. In some examples, the alternative SSB is quasi co-located with the ultra-reliable low latency communication traffic.

In some examples, the message is transmitted to a first UE served by the first base station via a wireless link, and the signal transmitter 1340 may be configured as or otherwise support a means for transmitting, to the first UE, the signal using the indicated resources. In some examples, the message is transmitted to a first UE served by the first base station via a wireless link, and the measurement report receiver 1365 may be configured as or otherwise support a means for receiving, from the first UE, a measurement report indicating a result of the first UE performing a measurement procedure on the signal, the measurement report including one or more of a layer one measurement report or a layer three mobility measurement report.

In some examples, the message is transmitted to a second base station via a backhaul link serving a second UE, and the signal transmitter 1340 may be configured as or otherwise support a means for transmitting, to the second UE, the signal using the indicated resources.

In some examples, to support transmitting the message, the DCI transmitter 1370 may be configured as or otherwise support a means for transmitting, to a first UE served by the first base station, group-based DCI that includes the message indicating that the transmission of the at least one SSB is canceled and indicating the resources for the signal to be transmitted.

In some examples, the group-based DCI includes a cell identification (ID) of the first base station.

In some examples, the indicated resources for the signal are different from resources indicated by the configuration for the canceled at least one SSB indicated by the configuration of the set of multiple SSBs.

In some examples, the at least one SSB is canceled based on ultra-reliable low latency communication traffic being scheduled on resources indicated by the configuration for the at least one SSB, and the URLLC transmitter 1375 may be configured as or otherwise support a means for transmitting the ultra-reliable low latency communication traffic on the resources.

In some examples, the URLLC transmitter 1375 may be configured as or otherwise support a means for rate matching the ultra-reliable low latency communication traffic around the signal. In some examples, the URLLC transmitter 1375 may be configured as or otherwise support a means for transmitting the ultra-reliable low latency communication traffic and the signal via frequency division multiplexing.

Additionally or alternatively, the communications manager 1320 may support wireless communications at a first base station in accordance with examples as disclosed herein. The SSB configuration identifying component 1345 may be configured as or otherwise support a means for identifying a configuration of a set of multiple SSBs to be transmitted by a second base station. The SSB message update component 1350 may be configured as or otherwise support a means for receiving, from the second base station, an indication that downlink traffic is to be transmitted by the second base station on resources indicated by the identified configuration for at least one SSB of the set of multiple SSBs. The SSB update relayer 1355 may be configured as or otherwise support a means for transmitting, to a UE served by the first base station, a message indicating that a transmission of the at least one SSB of the set of multiple SSBs by the second base station is canceled and indicating resources for a signal to be transmitted by the second base station as an alternative to the canceled at least one SSB.

In some examples, to support receiving the indication that downlink traffic is to be transmitted by the second base station, the SSB message update component 1350 may be configured as or otherwise support a means for receiving, from the second base station, a message indicating that the transmission of the at least one SSB of the set of multiple SSBs by the second base station is canceled and indicating resources for the signal to be transmitted by the second base station as an alternative to the canceled at least one SSB.

In some examples, to support transmitting the message indicating that the transmission of the at least one SSB is canceled, the SSB update relayer 1355 may be configured as or otherwise support a means for transmitting, in the message and for each SSB of the canceled at least one SSB, an index or a resource location associated with the canceled at least one SSB.

In some examples, the canceled SSB duration component 1380 may be configured as or otherwise support a means for identifying, based on identified downlink traffic, a duration for which the at least one SSB are canceled.

In some examples, the signal is a CSI-RS. In some examples, the resources for the CSI-RS are periodically or aperiodically configured. In some examples, the signal is an alternative SSB.

In some examples, the measurement report reception component 1385 may be configured as or otherwise support a means for receiving, from the UE, a measurement report indicating a result of the signal transmitted by the second base station, the measurement report including a layer three mobility measurement report.

In some examples, the indicated resources for the signal are different from resources indicated by the configuration for the canceled at least one SSB indicated by the configuration of the set of multiple SSBs.

Figure 14:
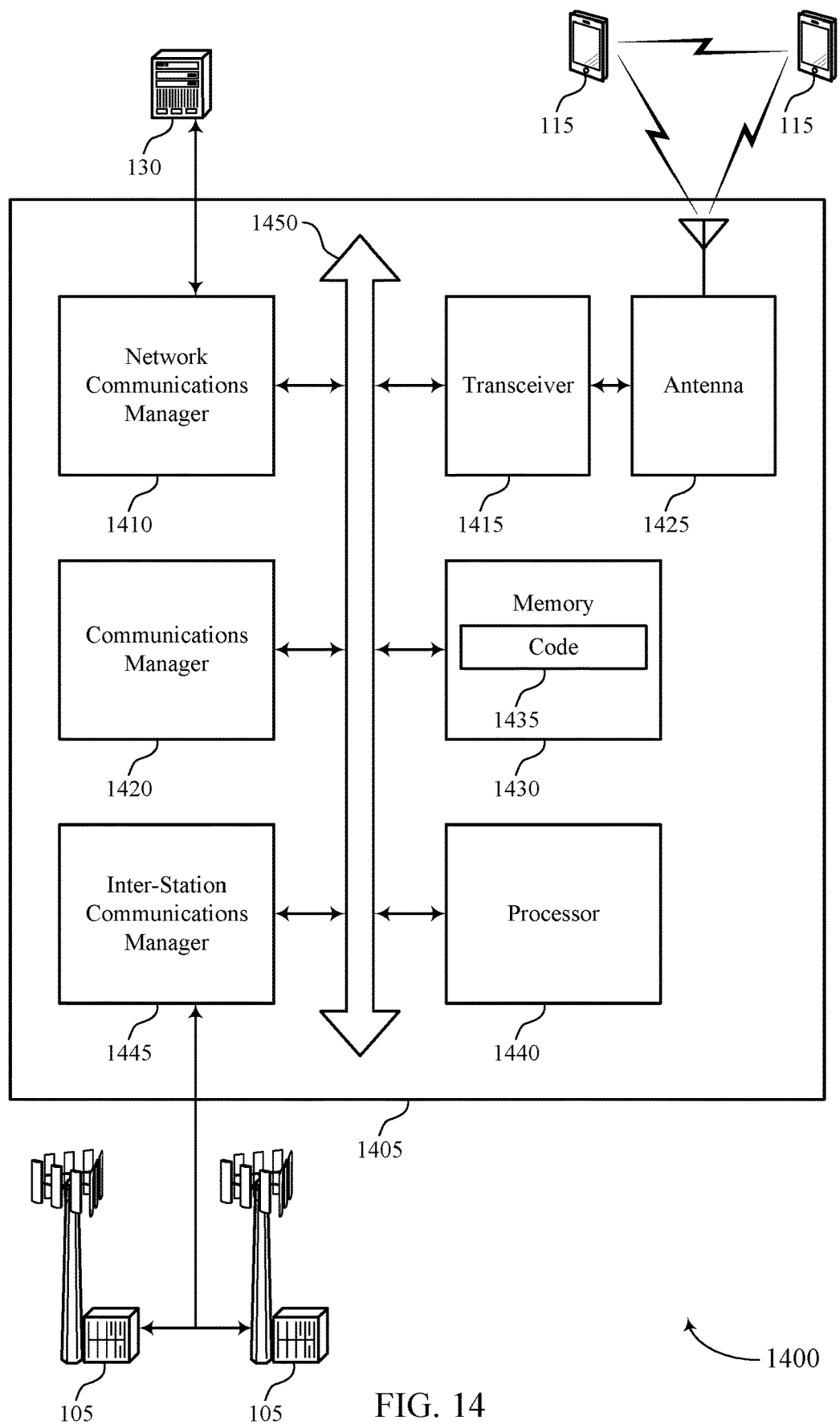
FIG. 14 shows a diagram of a system including a device that supports indication methods for SSB configuration changes in accordance with aspects of the present disclosure.

FIG. 14 shows a diagram of a system 1400 including a device 1405 that supports indication methods for SSB configuration changes in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting indication methods for SSB configuration changes). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a first base station in accordance with examples as disclosed herein. For example, the communications manager 1420 may be configured as or otherwise support a means for identifying a configuration of a set of multiple SSBs to be transmitted by the first base station. The communications manager 1420 may be configured as or otherwise support a means for identifying that downlink traffic is to be transmitted on resources indicated by the identified configuration for at least one SSB of the set of multiple SSBs. The communications manager 1420 may be configured as or otherwise support a means for transmitting a message indicating that a transmission of the at least one SSB of the set of multiple SSBs is canceled and indicating resources for a signal to be transmitted by the first base station as an alternative to the canceled at least one SSB. The communications manager 1420 may be configured as or otherwise support a means for transmitting, based on the received message, the signal using the indicated resources.

Additionally or alternatively, the communications manager 1420 may support wireless communications at a first base station in accordance with examples as disclosed herein. For example, the communications manager 1420 may be configured as or otherwise support a means for identifying a configuration of a set of multiple SSBs to be transmitted by a second base station. The communications manager 1420 may be configured as or otherwise support a means for receiving, from the second base station, an indication that downlink traffic is to be transmitted by the second base station on resources indicated by the identified configuration for at least one SSB of the set of multiple SSBs. The communications manager 1420 may be configured as or otherwise support a means for transmitting, to a UE served by the first base station, a message indicating that a transmission of the at least one SSB of the set of multiple SSBs by the second base station is canceled and indicating resources for a signal to be transmitted by the second base station as an alternative to the canceled at least one SSB.

By including or configuring the communications manager 1420 in accordance with examples as described herein, the device 1405 may support techniques for improved communication reliability, reduced latency, more efficient utilization of communication resources, and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of indication methods for SSB configuration changes as described herein, or the processor 1440 and the memory 1430 may be otherwise configured to perform or support such operations.

Figure 15:
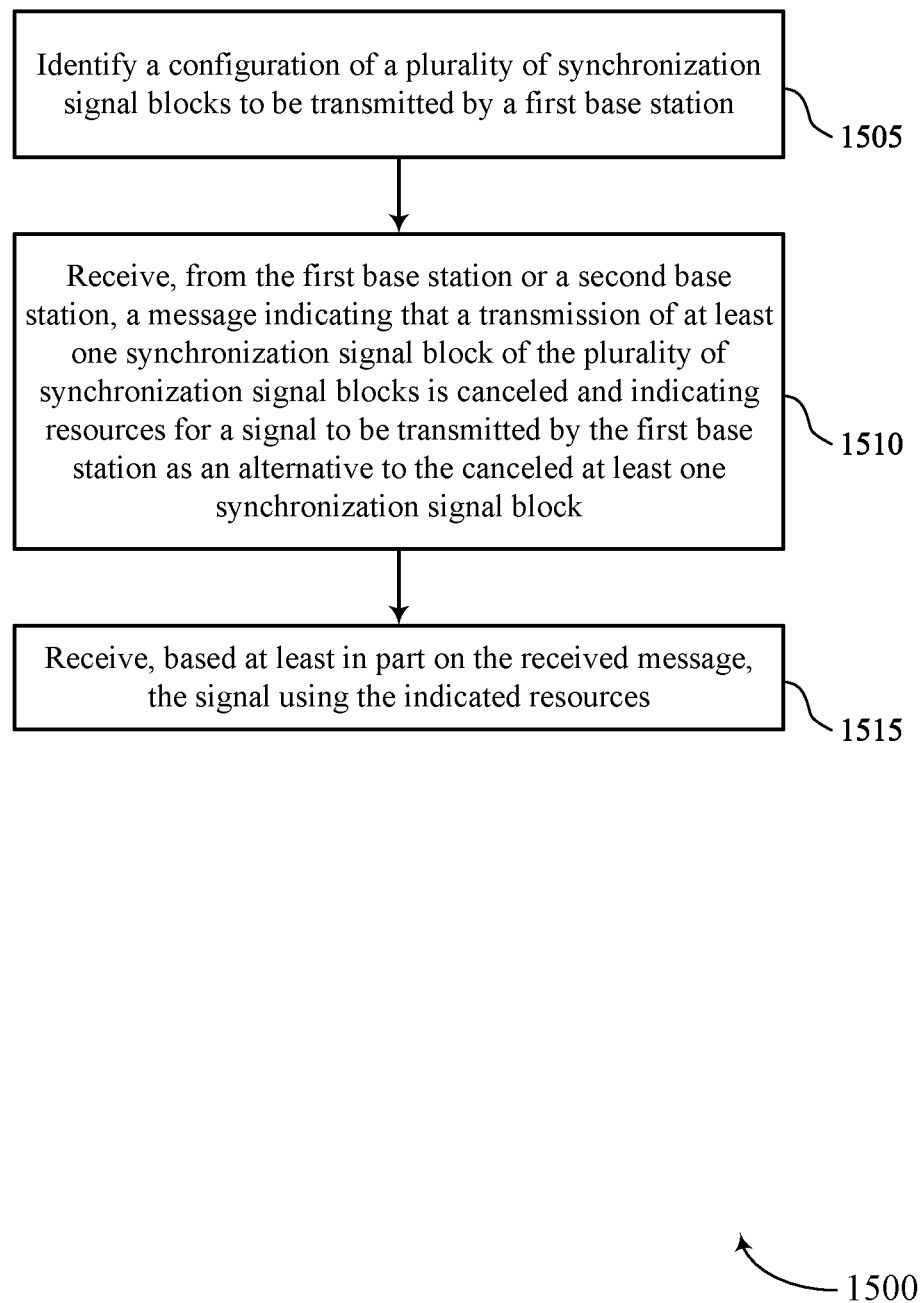
FIGS. 15 through 18 show flowcharts illustrating methods that support indication methods for SSB configuration changes in accordance with aspects of the present disclosure.

FIG. 15 shows a flowchart illustrating a method 1500 that supports indication methods for SSB configuration changes in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include identifying a configuration of a set of multiple SSBs to be transmitted by a first base station. The operations of 1505 may be performed in accordance with examples as disclosed herein. In some examples, aspects of the operations of 1505 may be performed by an SSB configuration identifier 925 as described with reference to FIG. 9.

At 1510, the method may include receiving, from the first base station or a second base station, a message indicating that a transmission of at least one SSB of the set of multiple SSBs is canceled and indicating resources for a signal to be transmitted by the first base station as an alternative to the canceled at least one SSB. The operations of 1510 may be performed in accordance with examples as disclosed herein. In some examples, aspects of the operations of 1510 may be performed by an SSB update message receiver 930 as described with reference to FIG. 9.

At 1515, the method may include receiving, based on the received message, the signal using the indicated resources. The operations of 1515 may be performed in accordance with examples as disclosed herein. In some examples, aspects of the operations of 1515 may be performed by a signal receiver 935 as described with reference to FIG. 9.

Figure 16:
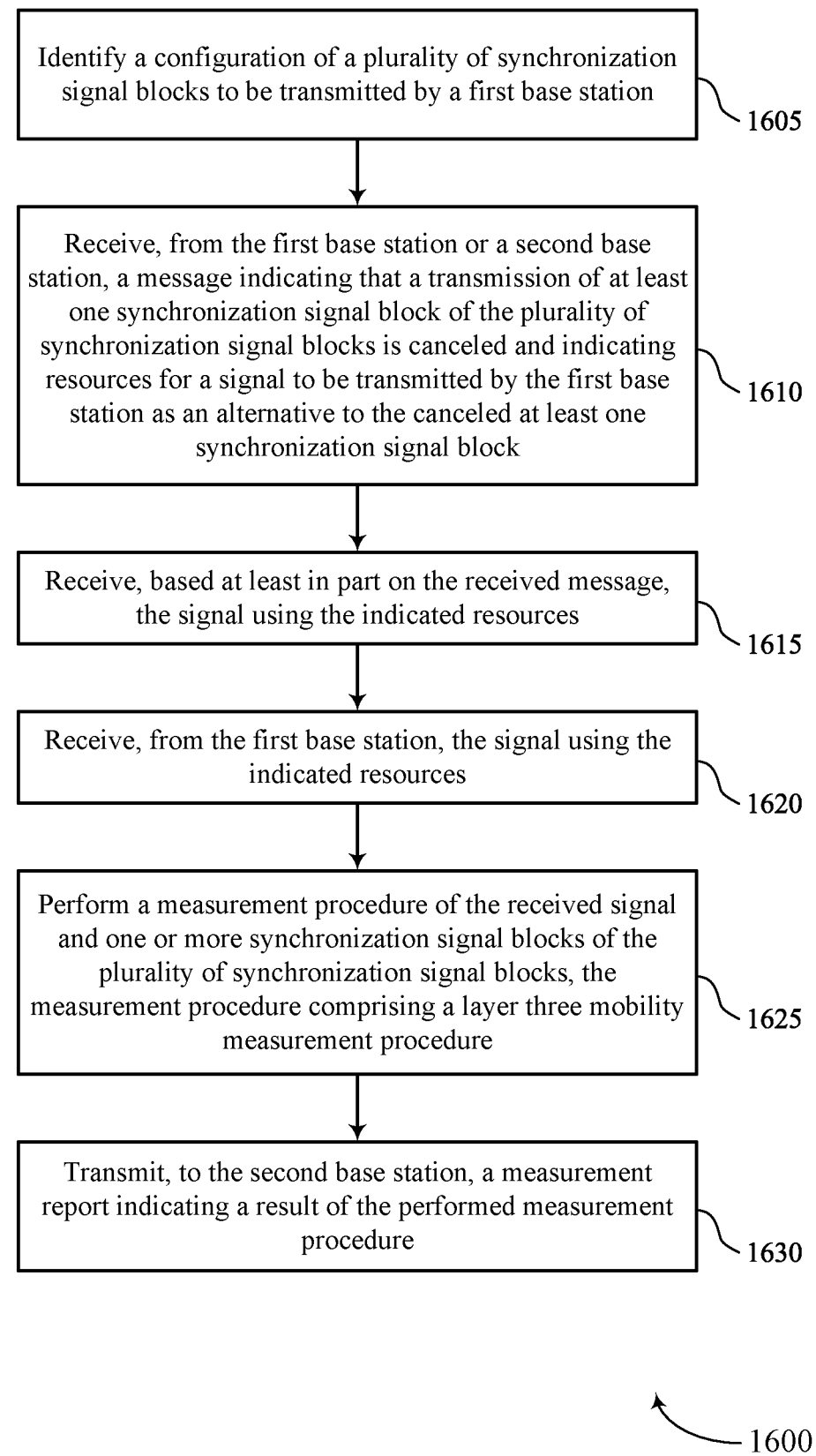

FIG. 16 shows a flowchart illustrating a method 1600 that supports indication methods for SSB configuration changes in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include identifying a configuration of a set of multiple SSBs to be transmitted by a first base station. The operations of 1605 may be performed in accordance with examples as disclosed herein. In some examples, aspects of the operations of 1605 may be performed by an SSB configuration identifier 925 as described with reference to FIG. 9.

At 1610, the method may include receiving, from the first base station or a second base station, a message indicating that a transmission of at least one SSB of the set of multiple SSBs is canceled and indicating resources for a signal to be transmitted by the first base station as an alternative to the canceled at least one SSB. The operations of 1610 may be performed in accordance with examples as disclosed herein. In some examples, aspects of the operations of 1610 may be performed by an SSB update message receiver 930 as described with reference to FIG. 9.

At 1615, the method may include receiving, based on the received message, the signal using the indicated resources. The operations of 1615 may be performed in accordance with examples as disclosed herein. In some examples, aspects of the operations of 1615 may be performed by a signal receiver 935 as described with reference to FIG. 9.

At 1620, the method may include receiving, from the first base station, the signal using the indicated resources. The operations of 1620 may be performed in accordance with examples as disclosed herein. In some examples, aspects of the operations of 1620 may be performed by a signal receiver 935 as described with reference to FIG. 9.

At 1625, the method may include performing a measurement procedure of the received signal and one or more SSBs of the set of multiple SSBs, the measurement procedure including a layer three mobility measurement procedure. The operations of 1625 may be performed in accordance with examples as disclosed herein. In some examples, aspects of the operations of 1625 may be performed by a measurement procedure performer 945 as described with reference to FIG. 9.

At 1630, the method may include transmitting, to the second base station, a measurement report indicating a result of the performed measurement procedure. The operations of 1630 may be performed in accordance with examples as disclosed herein. In some examples, aspects of the operations of 1630 may be performed by a measurement report transmitter 950 as described with reference to FIG. 9.

Figure 17:
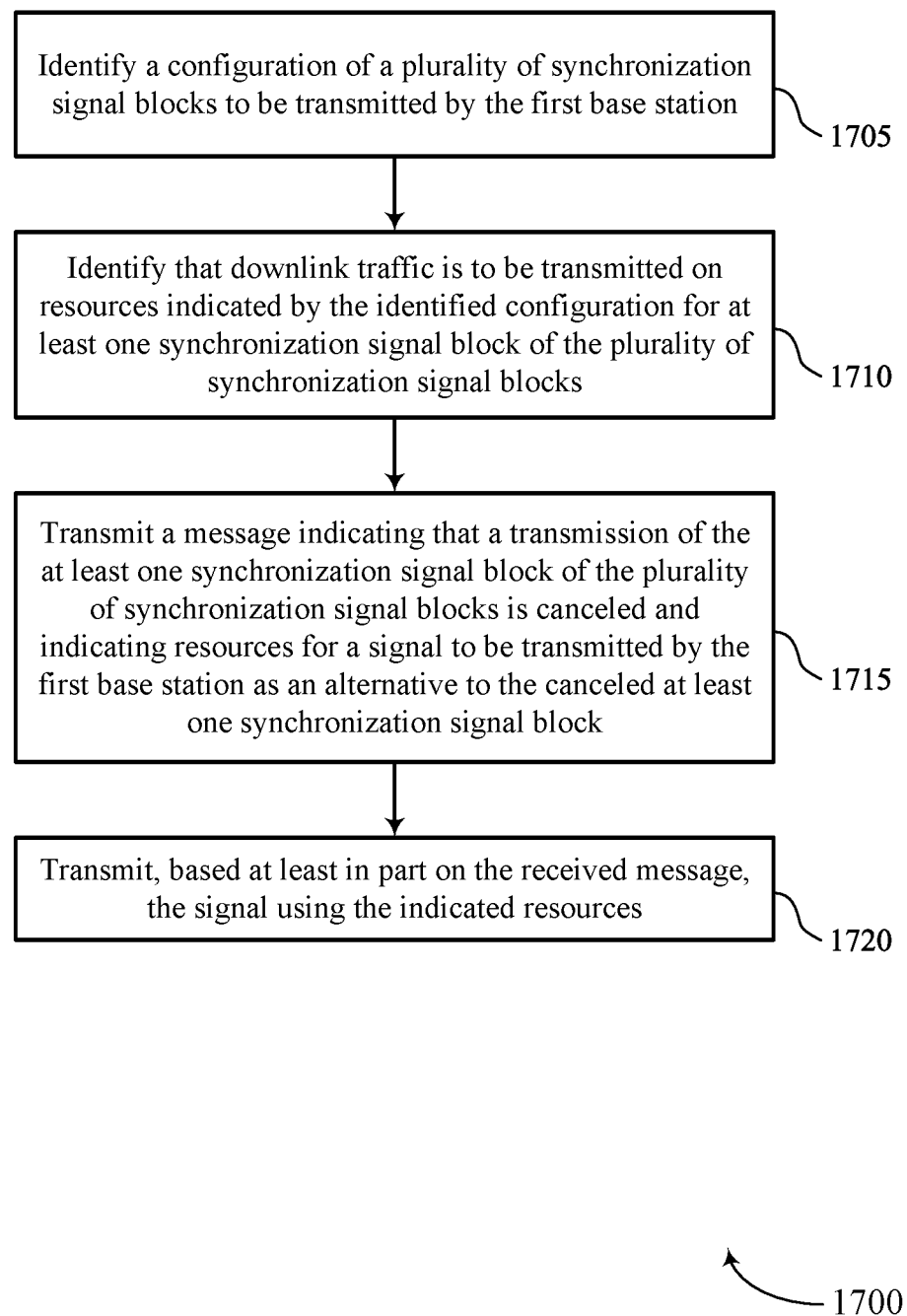

FIG. 17 shows a flowchart illustrating a method 1700 that supports indication methods for SSB configuration changes in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include identifying a configuration of a set of multiple SSBs to be transmitted by the first base station. The operations of 1705 may be performed in accordance with examples as disclosed herein. In some examples, aspects of the operations of 1705 may be performed by an SSB configuration identifying manager 1325 as described with reference to FIG. 13.

At 1710, the method may include identifying that downlink traffic is to be transmitted on resources indicated by the identified configuration for at least one SSB of the set of multiple SSBs. The operations of 1710 may be performed in accordance with examples as disclosed herein. In some examples, aspects of the operations of 1710 may be performed by a downlink traffic identifier 1330 as described with reference to FIG. 13.

At 1715, the method may include transmitting a message indicating that a transmission of the at least one SSB of the set of multiple SSBs is canceled and indicating resources for a signal to be transmitted by the first base station as an alternative to the canceled at least one SSB. The operations of 1715 may be performed in accordance with examples as disclosed herein. In some examples, aspects of the operations of 1715 may be performed by an SSB update message transmitter 1335 as described with reference to FIG. 13.

At 1720, the method may include transmitting, based on the received message, the signal using the indicated resources. The operations of 1720 may be performed in accordance with examples as disclosed herein. In some examples, aspects of the operations of 1720 may be performed by a signal transmitter 1340 as described with reference to FIG. 13.

Figure 18:
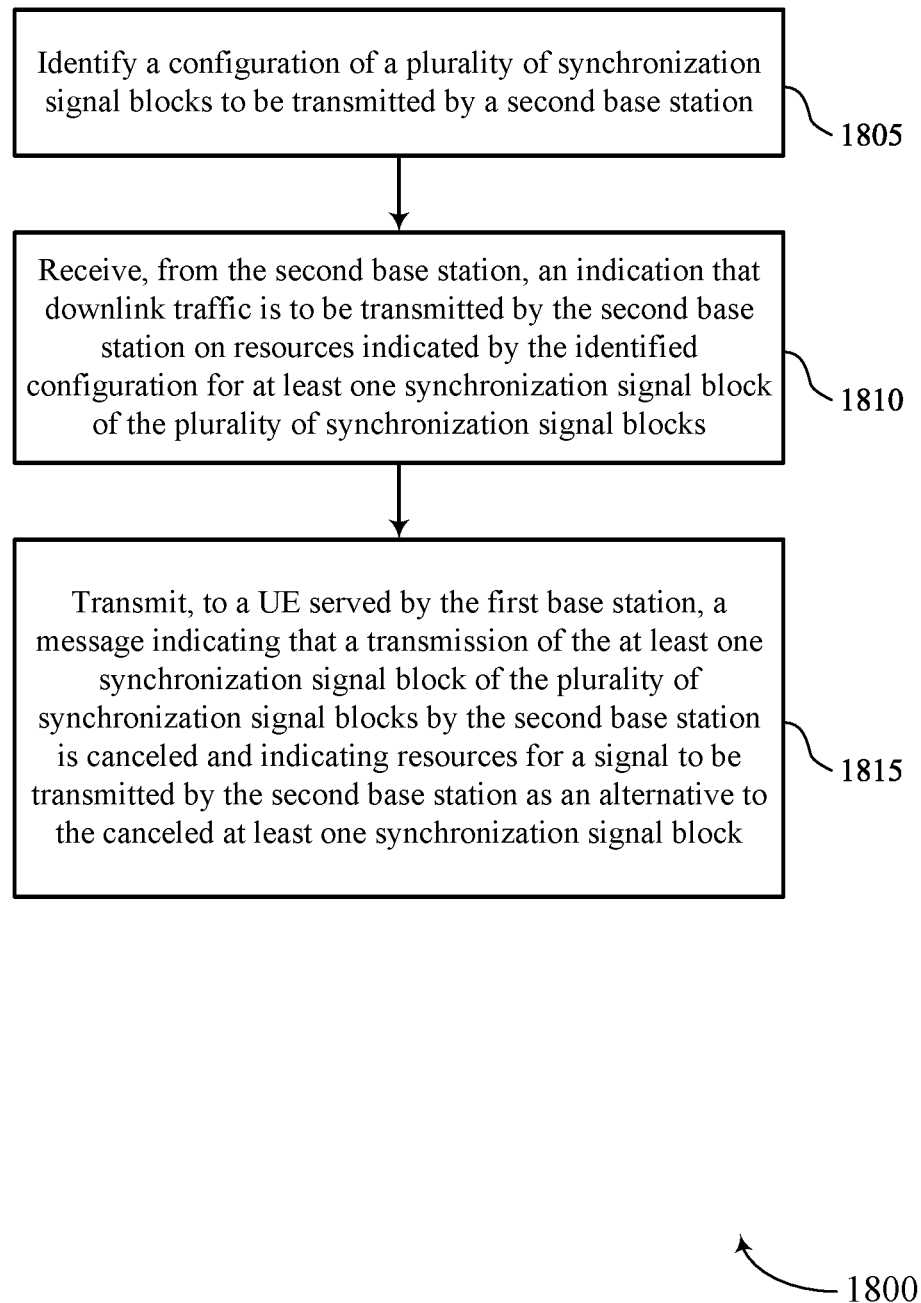

FIG. 18 shows a flowchart illustrating a method 1800 that supports indication methods for SSB configuration changes in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include identifying a configuration of a set of multiple SSBs to be transmitted by a second base station. The operations of 1805 may be performed in accordance with examples as disclosed herein. In some examples, aspects of the operations of 1805 may be performed by an SSB configuration identifying component 1345 as described with reference to FIG. 13.

At 1810, the method may include receiving, from the second base station, an indication that downlink traffic is to be transmitted by the second base station on resources indicated by the identified configuration for at least one SSB of the set of multiple SSBs. The operations of 1810 may be performed in accordance with examples as disclosed herein. In some examples, aspects of the operations of 1810 may be performed by an SSB message update component 1350 as described with reference to FIG. 13.

At 1815, the method may include transmitting, to a UE served by the first base station, a message indicating that a transmission of the at least one SSB of the set of multiple SSBs by the second base station is canceled and indicating resources for a signal to be transmitted by the second base station as an alternative to the canceled at least one SSB. The operations of 1815 may be performed in accordance with examples as disclosed herein. In some examples, aspects of the operations of 1815 may be performed by an SSB update relayer 1355 as described with reference to FIG. 13.

The following provides an overview of aspects of the present disclosure:

Aspect 1: A method for wireless communications at a UE, comprising: identifying a configuration of a plurality of synchronization signal blocks to be transmitted by a first base station; receiving, from the first base station or a second base station, a message indicating that a transmission of at least one synchronization signal block of the plurality of synchronization signal blocks is canceled and indicating resources for a signal to be transmitted by the first base station as an alternative to the canceled at least one synchronization signal block; and receiving, based at least in part on the received message, the signal using the indicated resources.

Aspect 2: The method of aspect 1, wherein receiving the message indicating that the transmission of the at least one synchronization signal block is canceled comprises: receiving, in the message and for each synchronization signal block of the canceled at least one synchronization signal block, an index or a resource location associated with the canceled at least one synchronization signal block.

Aspect 3: The method of any of aspects 1 through 2, further comprising: receiving, in the message, an indication of a duration for which the at least one synchronization signal block is canceled.

Aspect 4: The method of any of aspects 1 through 3, wherein the signal is a channel state information reference signal.

Aspect 5: The method of aspect 4, wherein the resources for the channel state information reference signal are periodically or aperiodically configured.

Aspect 6: The method of any of aspects 1 through 5, wherein the signal is an alternative synchronization signal block.

Aspect 7: The method of aspect 6, wherein the at least one synchronization signal block is canceled based at least in part on ultra-reliable low latency communication traffic being scheduled on resources for the at least one synchronization signal block.

Aspect 8: The method of aspect 7, wherein the alternative synchronization signal block is quasi co-located with the ultra-reliable low latency communication traffic.

Aspect 9: The method of any of aspects 1 through 8, wherein the message is received from the first base station and the first base station is a serving base station of the UE, the method further comprising: receiving, from the first base station, the signal using the indicated resources; performing a measurement procedure of the received signal and the one or more synchronization signal blocks of the plurality of synchronization signal blocks, the measurement procedure comprising one or more of a layer one measurement procedure or a layer three mobility measurement procedure; and transmitting, to the first base station, a measurement report indicating a result of the performed measurement procedure.

Aspect 10: The method of any of aspects 1 through 9, wherein the message is received from the second base station and the second base station is a serving base station of one or more neighbor UEs, the method further comprises: receiving, from the first base station, the signal using the indicated resources; performing a measurement procedure of the received signal and one or more synchronization signal blocks of the plurality of synchronization signal blocks, the measurement procedure comprising a layer three mobility measurement procedure; and transmitting, to the second base station, a measurement report indicating a result of the performed measurement procedure.

Aspect 11: The method of any of aspects 1 through 10, wherein receiving the message further comprises: receiving, from the first base station, group-based downlink control information that includes the message indicating that the transmission of at least one synchronization signal block is canceled and indicating the resources for the signal to be transmitted.

Aspect 12: The method of aspect 11, wherein the group-based downlink control information includes a cell identification (ID) of the first base station.

Aspect 13: The method of any of aspects 1 through 12, wherein receiving the message further comprises: receiving, from the second base station, a radio resource control transmission that includes the message indicating that the transmission of at least one synchronization signal block is canceled and indicating the resources for the signal to be transmitted.

Aspect 14: The method of any of aspects 1 through 13, wherein the indicated resources for the signal are different from resources indicated by the configuration for the canceled at least one synchronization signal block indicated by the configuration of the plurality of synchronization signal blocks.

Aspect 15: The method of any of aspects 1 through 14, wherein the at least one synchronization signal block is canceled based at least in part on ultra-reliable low latency communication traffic being scheduled on resources indicated by the configuration for the at least one synchronization signal block, the method further comprising: receiving the ultra-reliable low latency communication traffic on the resources.

Aspect 16: The method of aspect 15, further comprising: rate matching the ultra-reliable low latency communication traffic around the signal; or receiving the ultra-reliable low latency communication traffic and the signal via frequency division multiplexing.

Aspect 17: A method for wireless communications at a first base station, comprising: identifying a configuration of a plurality of synchronization signal blocks to be transmitted by the first base station; identifying that downlink traffic is to be transmitted on resources indicated by the identified configuration for at least one synchronization signal block of the plurality of synchronization signal blocks; transmitting a message indicating that a transmission of the at least one synchronization signal block of the plurality of synchronization signal blocks is canceled and indicating resources for a signal to be transmitted by the first base station as an alternative to the canceled at least one synchronization signal block; and transmitting, based at least in part on the received message, the signal using the indicated resources.

Aspect 18: The method of aspect 17, wherein transmitting the message indicating that the transmission of the at least one synchronization signal block is canceled comprises: transmitting, in the message and for each synchronization signal block of the canceled at least one synchronization signal block, an index or a resource location associated with the canceled at least one synchronization signal block.

Aspect 19: The method of any of aspects 17 through 18, further comprising: transmitting, in the message, an indication of a duration for which the at least one synchronization signal block is canceled.

Aspect 20: The method of any of aspects 17 through 19, wherein the signal is a channel state information reference signal.

Aspect 21: The method of aspect 20, wherein the resources for the channel state information reference signal are periodically or aperiodically configured.

Aspect 22: The method of any of aspects 17 through 21, wherein the signal is an alternative synchronization signal block.

Aspect 23: The method of aspect 22, wherein the at least one synchronization signal block is canceled based at least in part on ultra-reliable low latency communication traffic being scheduled on resources for the at least one synchronization signal block.

Aspect 24: The method of aspect 23, wherein the alternative synchronization signal block is quasi co-located with the ultra-reliable low latency communication traffic.

Aspect 25: The method of any of aspects 17 through 24, wherein the message is transmitted to a first UE served by the first base station via a wireless link, the method further comprising: transmitting, to the first UE, the signal using the indicated resources; and receiving, from the first UE, a measurement report indicating a result of the first UE performing a measurement procedure on the signal, the measurement report comprising one or more of a layer one measurement report or a layer three mobility measurement report.

Aspect 26: The method of any of aspects 17 through 25, wherein the message is transmitted to a second base station via a backhaul link serving a second UE, the method further comprises: transmitting, to the second UE, the signal using the indicated resources.

Aspect 27: The method of any of aspects 17 through 26, wherein transmitting the message further comprises: transmitting, to a first UE served by the first base station, group-based downlink control information that includes the message indicating that the transmission of the at least one synchronization signal block is canceled and indicating the resources for the signal to be transmitted.

Aspect 28: The method of aspect 27, wherein the group-based downlink control information includes a cell identification (ID) of the first base station.

Aspect 29: The method of any of aspects 17 through 28, wherein the indicated resources for the signal are different from resources indicated by the configuration for the canceled at least one synchronization signal block indicated by the configuration of the plurality of synchronization signal blocks.

Aspect 30: The method of any of aspects 17 through 29, wherein the at least one synchronization signal block is canceled based at least in part on ultra-reliable low latency communication traffic being scheduled on resources indicated by the configuration for the at least one synchronization signal block, the method further comprising: transmitting the ultra-reliable low latency communication traffic on the resources.

Aspect 31: The method of aspect 30, further comprising: rate matching the ultra-reliable low latency communication traffic around the signal; or transmitting the ultra-reliable low latency communication traffic and the signal via frequency division multiplexing.

Aspect 32: A method for wireless communications at a first base station, comprising: identifying a configuration of a plurality of synchronization signal blocks to be transmitted by a second base station; receiving, from the second base station, an indication that downlink traffic is to be transmitted by the second base station on resources indicated by the identified configuration for at least one synchronization signal block of the plurality of synchronization signal blocks; and transmitting, to a UE served by the first base station, a message indicating that a transmission of the at least one synchronization signal block of the plurality of synchronization signal blocks by the second base station is canceled and indicating resources for a signal to be transmitted by the second base station as an alternative to the canceled at least one synchronization signal block.

Aspect 33: The method of aspect 32, wherein receiving the indication that downlink traffic is to be transmitted by the second base station comprises: receiving, from the second base station, a message indicating that the transmission of the at least one synchronization signal block of the plurality of synchronization signal blocks by the second base station is canceled and indicating resources for the signal to be transmitted by the second base station as an alternative to the canceled at least one synchronization signal block.

Aspect 34: The method of any of aspects 32 through 33, wherein transmitting the message indicating that the transmission of the at least one synchronization signal block is canceled comprises: transmitting, in the message and for each synchronization signal block of the canceled at least one synchronization signal block, an index or a resource location associated with the canceled at least one synchronization signal block.

Aspect 35: The method of any of aspects 32 through 34, further comprising: identifying, based at least in part on identified downlink traffic, a duration for which the at least one synchronization signal block are canceled.

Aspect 36: The method of any of aspects 32 through 35, wherein the signal is a channel state information reference signal.

Aspect 37: The method of aspect 36, wherein the resources for the channel state information reference signal are periodically or aperiodically configured.

Aspect 38: The method of any of aspects 32 through 37, wherein the signal is an alternative synchronization signal block.

Aspect 39: The method of any of aspects 32 through 38, further comprising: receiving, from the UE, a measurement report indicating a result of the signal transmitted by the second base station, the measurement report comprising a layer three mobility measurement report.

Aspect 40: The method of any of aspects 32 through 39, wherein the indicated resources for the signal are different from resources indicated by the configuration for the canceled at least one synchronization signal block indicated by the configuration of the plurality of synchronization signal blocks.

Aspect 41: An apparatus for wireless communications at a UE, comprising a processor; memory coupled with the processor; and instructions stored in the memory and executable by the processor to cause the apparatus to perform a method of any of aspects 1 through 16.

Aspect 42: An apparatus for wireless communications at a UE, comprising at least one means for performing a method of any of aspects 1 through 16.

Aspect 43: A non-transitory computer-readable medium storing code for wireless communications at a UE, the code comprising instructions executable by a processor to perform a method of any of aspects 1 through 16.

Aspect 44: An apparatus for wireless communications at a first base station, comprising a processor; memory coupled with the processor; and instructions stored in the memory and executable by the processor to cause the apparatus to perform a method of any of aspects 17 through 31.

Aspect 45: An apparatus for wireless communications at a first base station, comprising at least one means for performing a method of any of aspects 17 through 31.

Aspect 46: A non-transitory computer-readable medium storing code for wireless communications at a first base station, the code comprising instructions executable by a processor to perform a method of any of aspects 17 through 31.

Aspect 47: An apparatus for wireless communications at a first base station, comprising a processor; memory coupled with the processor; and instructions stored in the memory and executable by the processor to cause the apparatus to perform a method of any of aspects 32 through 40.

Aspect 48: An apparatus for wireless communications at a first base station, comprising at least one means for performing a method of any of aspects 32 through 40.

Aspect 49: A non-transitory computer-readable medium storing code for wireless communications at a first base station, the code comprising instructions executable by a processor to perform a method of any of aspects 32 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      identify a configuration of a plurality of synchronization signal blocks to be transmitted by a first network entity;
      receive, from a second network entity that is a serving network entity for the UE, a message indicating that a transmission of at least one synchronization signal block of the plurality of synchronization signal blocks is canceled, wherein the message indicates resources for a signal to be transmitted by the first network entity as an alternative to the canceled at least one synchronization signal block; and
      receive, from the first network entity and based at least in part on the message received from the second network entity, the signal using the indicated resources.

2. The apparatus of claim 1, wherein the instructions to receive the message indicating that the transmission of the at least one synchronization signal block is canceled are executable by the processor to cause the apparatus to:
   receive, in the message and for each synchronization signal block of the canceled at least one synchronization signal block, an index or a resource location associated with the canceled at least one synchronization signal block.

3. The apparatus of claim 1, wherein the instructions are further executable by the processor to cause the apparatus to:
   receive, in the message, an indication of a duration for which the at least one synchronization signal block is canceled.

4. The apparatus of claim 1, wherein the signal is a channel state information reference signal.

5. The apparatus of claim 4, wherein the resources for the channel state information reference signal are periodically or aperiodically configured.

6. The apparatus of claim 1, wherein the signal is an alternative synchronization signal block.

7. The apparatus of claim 6, wherein the at least one synchronization signal block is canceled based at least in part on ultra-reliable low latency communication traffic being scheduled on resources for the at least one synchronization signal block.

8. The apparatus of claim 7, wherein the alternative synchronization signal block is quasi co-located with the ultra-reliable low latency communication traffic.

9. The apparatus of claim 1, wherein the instructions are further executable by the processor to cause the apparatus to:
receive, from the first network entity, the signal using the indicated resources;
perform a measurement procedure of the received signal and one or more synchronization signal blocks of the plurality of synchronization signal blocks, the measurement procedure comprising a layer three mobility measurement procedure; and
transmit, to the second network entity, a measurement report indicating a result of the performed measurement procedure.

10. The apparatus of claim 1, wherein the instructions to receive the message are further executable by the processor to cause the apparatus to:
receive group-based downlink control information that includes the message indicating that the transmission of at least one synchronization signal block is canceled and indicating the resources for the signal to be transmitted.

11. The apparatus of claim 10, wherein the group-based downlink control information includes a cell identification (ID) of the first network entity.

12. The apparatus of claim 1, wherein the at least one synchronization signal block is canceled based at least in part on ultra-reliable low latency communication traffic being scheduled on resources indicated by the configuration for the at least one synchronization signal block, and the instructions are further executable by the processor to cause the apparatus to:
receive the ultra-reliable low latency communication traffic on the resources.

13. The apparatus of claim 12, wherein the instructions are further executable by the processor to cause the apparatus to:
rate match the ultra-reliable low latency communication traffic around the signal; or
receive the ultra-reliable low latency communication traffic and the signal via frequency division multiplexing.

14. An apparatus for wireless communications at a first network entity, comprising:
a processor;
memory coupled with the processor; and
instructions stored in the memory and executable by the processor to cause the apparatus to:
identify a configuration of a plurality of synchronization signal blocks to be transmitted by the first network entity;
identify that downlink traffic is to be transmitted on resources indicated by the identified configuration for at least one synchronization signal block of the plurality of synchronization signal blocks;
transmit, to a second network entity that is a serving network entity for a user equipment (UE), a message indicating that a transmission of the at least one synchronization signal block of the plurality of synchronization signal blocks is canceled, wherein the message indicates resources for a signal to be transmitted by the first network entity as an alternative to the canceled at least one synchronization signal block; and
transmit, to the UE based at least in part on the message, the signal using the indicated resources.

15. The apparatus of claim 14, wherein the instructions to transmit the message indicating that the transmission of the at least one synchronization signal block is canceled are executable by the processor to cause the apparatus to:
transmit, in the message and for each synchronization signal block of the canceled at least one synchronization signal block, an index or a resource location associated with the canceled at least one synchronization signal block.

16. The apparatus of claim 14, wherein the instructions are further executable by the processor to cause the apparatus to:
transmit, in the message, an indication of a duration for which the at least one synchronization signal block is canceled.

17. The apparatus of claim 14, wherein the signal is a channel state information reference signal.

18. The apparatus of claim 14, wherein the signal is an alternative synchronization signal block.

19. The apparatus of claim 14, wherein the instructions are further executable by the processor to cause the apparatus to:
transmit, to the UE, the signal using the indicated resources; and
receive, from the UE, a measurement report indicating a result of the UE performing a measurement procedure on the signal, the measurement report comprising one or more of a layer one measurement report or a layer three mobility measurement report.

20. The apparatus of claim 14, wherein the message is transmitted via a backhaul link to the second network entity.

21. The apparatus of claim 14, wherein the message includes a cell identification (ID) of the first network entity.

22. An apparatus for wireless communications at a first network entity, comprising:
a processor;
memory coupled with the processor; and
instructions stored in the memory and executable by the processor to cause the apparatus to:
identify a configuration of a plurality of synchronization signal blocks to be transmitted by a second network entity;
receive, from the second network entity, an indication that downlink traffic is to be transmitted by the second network entity on resources indicated by the identified configuration for at least one synchronization signal block of the plurality of synchronization signal blocks; and
transmit, to a user equipment (UE) served by the first network entity, a message indicating that a transmission of the at least one synchronization signal block of the plurality of synchronization signal blocks by the second network entity is canceled and indicating resources for a signal to be transmitted by the second network entity as an alternative to the canceled at least one synchronization signal block.

23. A method for wireless communications at a user equipment (UE), comprising:
identifying a configuration of a plurality of synchronization signal blocks to be transmitted by a first network entity;

receiving, from a second network entity that is a serving network entity for the UE, a message indicating that a transmission of at least one synchronization signal block of the plurality of synchronization signal blocks is canceled, wherein the message indicates resources for a signal to be transmitted by the first network entity as an alternative to the canceled at least one synchronization signal block; and receiving, from the first network entity and based at least in part on the received message received from the second network entity, the signal using the indicated resources.

24. The method of claim 23, wherein receiving the message indicating that the transmission of the at least one synchronization signal block is canceled comprises:

receiving, in the message and for each synchronization signal block of the canceled at least one synchronization signal block, an index or a resource location associated with the canceled at least one synchronization signal block.

25. The method of claim 23, further comprising:

receiving, in the message, an indication of a duration for which the at least one synchronization signal block is canceled.

26. The method of claim 23, wherein the signal is a channel state information reference signal.

27. The method of claim 23, wherein the signal is an alternative synchronization signal block.

28. The method of claim 23, wherein receiving the message indicating that the transmission of the at least one synchronization signal block is canceled comprises:

receiving group-based downlink control information that includes the message indicating that the transmission of the at least one synchronization signal block is canceled and indicating the resources for the signal to be transmitted, wherein the group-based downlink control information includes a cell identification (ID) of the first network entity.

* * * * *